(12) United States Patent
Liu et al.

(10) Patent No.: US 12,124,270 B2
(45) Date of Patent: Oct. 22, 2024

(54) SYSTEMS AND METHODS FOR VSLAM SCALE ESTIMATION USING OPTICAL FLOW SENSOR ON A ROBOTIC DEVICE

(71) Applicant: QUALCOMM Incorporated, San Diego, CA (US)

(72) Inventors: Jun Liu, Shenzhen (CN); Zixiang Wang, Shenzhen (CN); Weizhang Luo, Shenzhen (CN); Mei Wu Fang, Shenzhen (CN); Tiequan Luo, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 789 days.

(21) Appl. No.: 17/265,455

(22) PCT Filed: Sep. 15, 2018

(86) PCT No.: PCT/CN2018/105898
§ 371 (c)(1),
(2) Date: Feb. 2, 2021

(87) PCT Pub. No.: WO2020/051923
PCT Pub. Date: Mar. 19, 2020

(65) Prior Publication Data
US 2021/0232151 A1 Jul. 29, 2021

(51) Int. Cl.
*G05D 1/00* (2024.01)
*G06T 7/20* (2017.01)
*G06T 7/70* (2017.01)

(52) U.S. Cl.
CPC .............. *G05D 1/0253* (2013.01); *G06T 7/20* (2013.01); *G06T 7/70* (2017.01)

(58) Field of Classification Search
CPC ......... G05D 1/0253; G05D 2201/0215; G05D 1/02; G06T 7/70; G06T 7/20
See application file for complete search history.

(56) References Cited

U.S. PATENT DOCUMENTS

2015/0304634 A1* 10/2015 Karvounis ........ G06F 18/21355
348/46
2016/0349362 A1* 12/2016 Rohr ....................... G01S 13/86
(Continued)

FOREIGN PATENT DOCUMENTS

| CN | 106529587 A | 3/2017 |
| CN | 106803261 A | 6/2017 |

(Continued)

OTHER PUBLICATIONS

Mohamed S.A.S., et al., "A Survey on Odometry for Autonomous Navigation Systems", IEEE Access, vol. 7, Jul. 16, 2019 (Jul. 16, 2019), pp. 97466-97486, XP011737314, DOI: 10.1109/ACCESS. 2019.2929133 [retrieved on Jul. 31, 2019] the whole document (21 pages).
Nagatani K., et al., "Improvement of Odometry for Omnidirectional Vehicle Using Optical Flow Information", Proceedings, 2000 IEEE/ RSJ International Conference on Intelligent Robots and Systems (IROS 2000), Oct. 31-Nov. 5, 2000, Takamatsu, Japan, IEEE, Piscataway, NJ, USA, vol. 1, Oct. 31, 2000, pp. 468-473 (6pages), XP032883243, DOI: 10.1109/IROS.2000.894648, ISBN: 978-0- 7803-6348-9, abstract, sections 1-6, Figs. 1-9.

(Continued)

*Primary Examiner* — Behrang Badii
*Assistant Examiner* — Jay Khandpur
(74) *Attorney, Agent, or Firm* — The Marbury Law Group

(57) ABSTRACT

Various embodiments include methods for improving navigation by a processor of a robotic device equipped with an image sensor and an optical flow sensor. The robotic device may be configured to capture or receive two image frames from the image sensor, generate a homograph computation based on the image frames, receive optical flow sensor data from an optical flow sensor, and determine a scale estimation value based on the homograph computation and the optical (Continued)

flow sensor data. The robotic device may determine the robotic device pose (or the pose of the image sensor) based on the scale estimation value.

30 Claims, 15 Drawing Sheets

(56) References Cited

U.S. PATENT DOCUMENTS

| | | | |
|---|---|---|---|
| 2017/0136626 A1 | 5/2017 | Wang et al. | |
| 2017/0188510 A1* | 7/2017 | Einecke | H04N 7/183 |
| 2017/0206665 A1 | 7/2017 | Mathew et al. | |
| 2017/0269586 A1* | 9/2017 | D'Andrea | A63H 17/26 |
| 2017/0337470 A1* | 11/2017 | DeTone | G06T 7/12 |
| 2018/0043952 A1 | 2/2018 | Ellerman et al. | |
| 2018/0292825 A1* | 10/2018 | Smolyanskiy | G05D 1/024 |
| 2018/0292925 A1* | 10/2018 | Li | G06F 3/041 |
| 2019/0114777 A1* | 4/2019 | Maity | G06T 15/205 |
| 2020/0051279 A1* | 2/2020 | Nakano | G06T 7/80 |

FOREIGN PATENT DOCUMENTS

| | | |
|---|---|---|
| CN | 107610175 A | 1/2018 |
| CN | 108469823 A | 8/2018 |
| TW | 201719309 A | 6/2017 |
| TW | 201826993 A | 8/2018 |

OTHER PUBLICATIONS

Supplementary European Search Report—EP18933675—Search Authority—Munich—Apr. 8, 2022, 10 pages.
Zhou D., et al., "Reliable Scale Estimation and Correction for Monocular Visual Odometry", 2016 IEEE Intelligent Vehicles Symposium, Jun. 19, 2016, pp. 490-495, XP032939009, DOI: 10.1109/IVS.2016.7535431, [retrieved on Aug. 5, 2016], abstract, sections I-V, Figs. 1-9. (6 pages).
Taiwan Search Report—TW108129210—TIPO—Jul. 24, 2023 1 page.
International Search Report and Written Opinion for International Application No. PCT/CN2018/105898, mailed Jun. 17, 2019, 9 pages.

* cited by examiner

SYSTEMS AND METHODS FOR VSLAM SCALE ESTIMATION USING OPTICAL FLOW SENSOR ON A ROBOTIC DEVICE

BACKGROUND

Robotic devices have become increasingly commonplace for performing various tasks in a semi-autonomous or autonomous manner. Such robotic devices may be embodied in a variety of forms and used in a variety of applications, such as in automated vacuum cleaners, unmanned aerial vehicles, terrestrial vehicle, etc. Applications for which robotic devices may be employed may include entertainment applications (e.g., toy robots), utility applications in environments that are unfriendly to humans (e.g., space, deep water, cold temperature, radiation, chemical exposure, biohazards, etc.), dangerous tasks (e.g., defusing of explosives), operation in confined spaces (e.g., collapsed buildings) performing menial tasks (e.g., cleaning), etc.

Since many environments are not static, a robotic device may be provided with mapping techniques allowing the device to construct a map of its surroundings. Further, a robotic device may be configured to localize itself within the map, and thereby exhibit a relatively high degree of autonomy. However, autonomous navigation may be complex due to temporal and spatial variations in the local environment, as well as changes in the position and motion of obstacles. Such complexities may create navigation problems for the robotic device using existing techniques.

SUMMARY

Various aspects include methods, robotic devices implementing such methods, and processing devices within robotic vehicles for accomplishing visual simultaneous localization and mapping using data from an optical flow sensor. Some aspects may include receiving a first image frame from a monocular image sensor, receiving a second image frame from the monocular image sensor, generating a homograph computation based on the first image frame and the second image frame, receiving optical flow sensor data from an optical flow sensor, and determining a scale estimation value based on the homograph computation and the optical flow sensor data.

In some aspects, generating the homograph computation based on the first image frame and the second image frame may include generating a homography matrix information structure, and generating a transaction information structure by performing a singular value decomposition (SVD) operation on the generated homography matrix information structure. In some aspects, generating the homograph computation based on the first image frame and the second image frame may include identifying at least four feature points in the first image frame, identifying at least four corresponding feature points in the second image frame, and generating the homography matrix information structure to include the identified at least four feature points and the identified at least four corresponding feature points.

Some aspects may include determining a robotic device pose of the robotic device based on the scale estimation value. Some aspects may include receiving wheel transaction data from a wheel encoder, determining a wheel-based scale estimation value based on the homograph computation and the wheel transaction data, determining a first confidence value based on the wheel-based scale estimation value, and determining a second confidence value based on the scale estimation value, in which determining the robotic device pose based on the scale estimation value may include determining the robotic device pose based on the scale estimation value in response to determining that the first confidence value does not exceed the second confidence value, and determining the robotic device pose based on the wheel transaction data in response to determining that the first confidence value exceeds the second confidence value.

In some aspects, generating the homograph computation based on the first image frame and the second image frame may include generating a camera transaction information structure based on the first image frame and the second image frame, and determining the wheel-based scale estimation value based on the homograph computation and the wheel transaction data may include generating a wheel encoder transaction information structure based on the wheel transaction data, and determining the wheel-based scale estimation value based on values included in the camera transaction information structure and values included in the wheel encoder transaction information structure.

Some aspects may include receiving wheel transaction data from a wheel encoder, determining an amount of slippage that occurred over a time period based on at least one of the wheel transaction data or the optical flow sensor data, and determining whether the determined amount of slippage exceeds a slippage threshold value, in which determining the scale estimation value based on the homograph computation and the optical flow sensor data may include determining the scale estimation value based on the homograph computation and the optical flow sensor data in response to determining that the determined amount of slippage exceeds the slippage threshold value, and determining the scale estimation value based on the homograph computation and the wheel transaction data in response to determining that the determined amount of slippage does not exceed the slippage threshold value.

Some aspects may include receiving wheel transaction data from a wheel encoder, determining whether the wheel transaction data may include erroneous or outlier data, in which determining the scale estimation value based on the homograph computation and the optical flow sensor data may include determining the scale estimation value based on the homograph computation and the optical flow sensor data in response to determining that the wheel transaction data may include erroneous or outlier data.

Some aspects may include receiving wheel transaction data from a wheel encoder, determining a first confidence value based on the wheel transaction data, determining a second confidence value based on the optical flow sensor data, and determining whether the first confidence value exceeds the second confidence value, in which determining the scale estimation value based on the homograph computation and the optical flow sensor data may include determining the scale estimation value based on the homograph computation and the optical flow sensor data in response to determining that the first confidence value does not exceed the second confidence value, and determining the scale estimation value based on the homograph computation and the wheel transaction data in response to determining that the first confidence value exceeds the second confidence value.

Some aspects may include applying the optical flow sensor data to a Lucas-Kanade component to generate optical flow information that may include a pixel speed value and a direction value for at least one feature point, and generating an optical flow sensor transaction information structure based on the optical flow information, in which determining the scale estimation value based on the homograph computation and the optical flow sensor data may include determining the scale estimation value based on the homograph computation and the generated optical flow sensor transaction information structure.

Further aspects include a robotic device having an optical flow sensor and a processor configured to perform one or more operations of the methods summarized above. Further aspects include a processing device for use in a robotic device that includes an optical flow sensor, in which the processing device is configured to perform one or more operations of the methods summarized above. Further aspects include a robotic device having means for performing functions of the methods summarized above. Further aspects may include a non-transitory processor-readable storage medium having stored thereon processor-executable instructions configured to cause a processor of a robotic device to perform operations of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
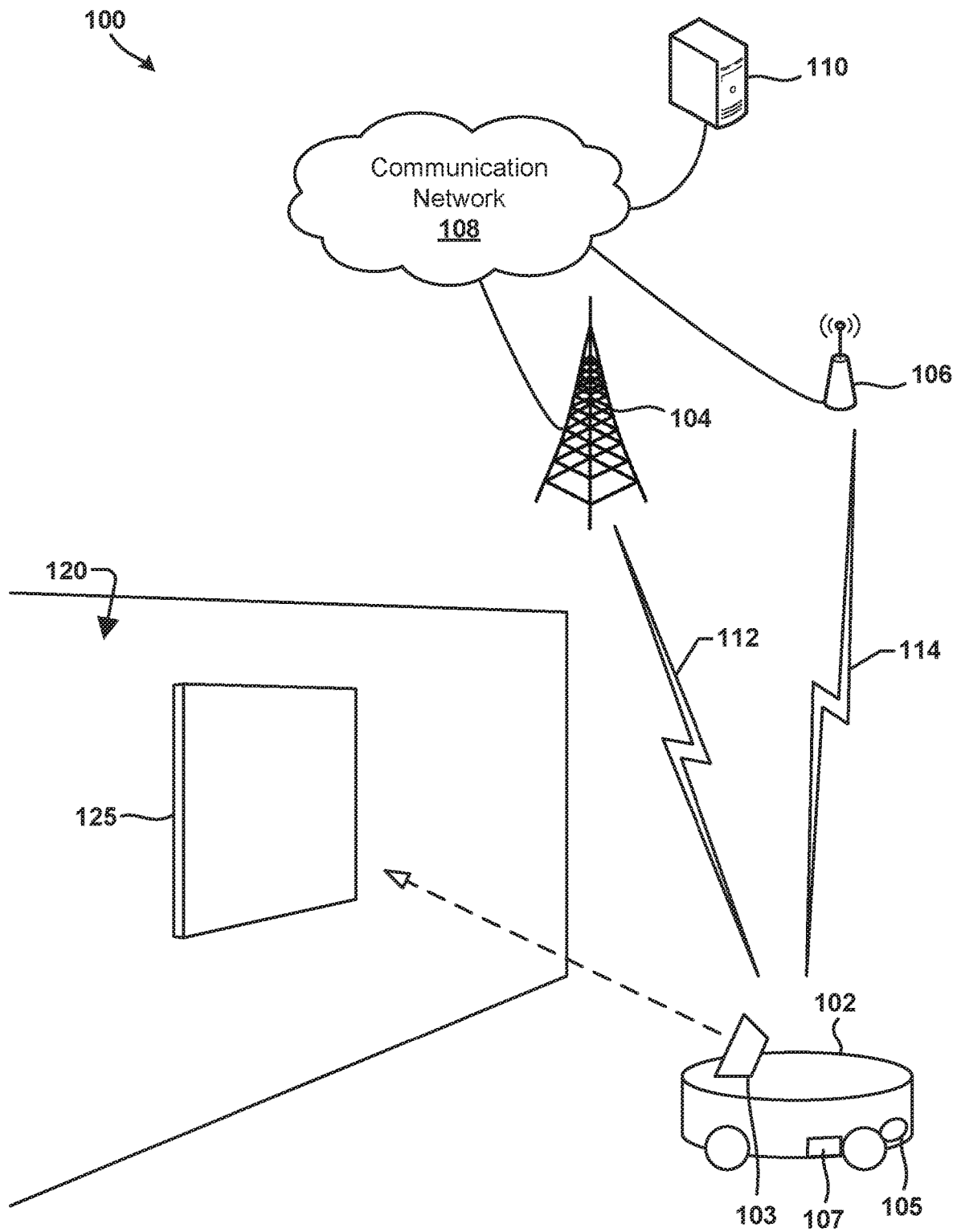
FIG. 1A is a system block diagram of a robotic device operating within a communication system according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods performed by a processor of a robotic device for improving navigation by employing localization and mapping techniques, such as visual simultaneous localization and mapping (VSLAM), leveraging information provided by an optical flow sensor to better plan a navigation path within the environment.

In some embodiments, the processor of the robotic device may be configured to receive a first image frame from an image sensor, receive a second image frame from the image sensor, generate homograph computation values based on the first and second image frames, and generate a homography matrix based on the homograph computation values, determine or generate a first transaction information structure (e.g., a three-element translation vector, etc.) based on the homography matrix or homograph computation values, receive optical flow sensor data from an optical flow sensor, determine or generate a second transaction information structure (e.g., an optical flow sensor transaction information structure) based on the optical flow sensor data, determine a scale estimation value based on the homograph computation values and the optical flow sensor data (e.g., based on the values in the first and second transaction information structures), and determine a robotic device pose based on the scale estimation value.

In some embodiments, the processor of the robotic device may be configured to also receive wheel transaction data from a wheel encoder. The processor may determine or compute a third transaction information structure (e.g., a wheel encoder transaction information structure) based on the wheel transaction data. The processor may determine whether the wheel transaction data is inaccurate or erroneous, or include outlier data (e.g., due to wheel slippage or spinning). The processor may use the wheel transaction data to determine the scale estimation value when the wheel transaction data is not inaccurate, erroneous, or outlier, and use the optical flow sensor data to determine scale estimation value when the wheel transaction data is inaccurate or erroneous, or include outlier data. For example, the processor may use the values in the first and third transaction information structures to determine the scale estimation value when the wheel transaction data is not inaccurate, erroneous or outlier, and use the values in the first and second transaction information structures to determine scale estimation value when the wheel transaction data is inaccurate or erroneous, or include outlier data.

By equipping the robotic device with an optical flow sensor and configuring the robotic device to intelligently use the optical flow sensor to identify, correct or improve inaccurate movement data, the various embodiments improve the performance and functioning of the robotic device. For example, the inclusion and use of an optical flow sensor in accordance with the various embodiments may allow the robotic device to better identify and respond to slippery conditions in which wheel rotations do not correlate well with actual device motions. The inclusion and use of an optical flow sensor in accordance with the various embodiments may also allow the robotic device to better plan its navigation path within the environment and enable traveling over surfaces where wheel slippage may be anticipated.

As used herein, the term "robotic device" refers any of various types of robotic vehicles, robotic appliances, robots, etc. that include an onboard processing device configured to provide some autonomous or semi-autonomous navigation and maneuvering capabilities. Examples of robotic devices include but are not limited to ground vehicles and robots (e.g., autonomous or semi-autonomous cars), robotic appliances (e.g., robotic vacuums and other cleaning robots), search and rescue robots, bomb detection and disarming robots, etc.) and combinations thereof. In some embodiments, the robotic device may be manned. In other embodiments, the robotic device may be unmanned. In embodiments in which the robotic device is autonomous, the robotic device may include an onboard processing device configured to maneuver and/or navigate the robotic device without remote operating instructions (i.e., autonomously), such as from a human operator (e.g., via a remote computing device). In embodiments in which the robotic device is semi-autonomous, the robotic device may include an onboard processing device configured to receive some information or instructions, such as from a human operator (e.g., via a remote computing device), and autonomously maneuver and/or navigate the robotic device consistent with the received information or instructions.

As used herein, the term "pose" refers to a value or information structure that identifies the position and orientation of a robotic device, or a component thereof, within its surrounding environment. In a configuration in which a robotic device travels in two dimensions, such as along the surface of a floor, the robotic device pose may be specified by a two-dimensional position (e.g., x,y distances or dimensions in Cartesian coordinates) and a heading ($\theta$). In some embodiments, the robotic device may be configured to estimate pose (e.g., camera pose, robotic device pose, etc.) based on a rigid transformation (R,T), where R is a rotation matrix (e.g., a three-by-three matrix information structure, etc.) and T is a transaction (e.g., a three-element translation vector information structure, etc.). In some embodiments, the values for the rotation matrix (R) and/or transaction (T) may be determined via the robotic device processor performing a singular value decomposition (SVD) operation on a homography matrix (H). In some embodiments, the values of the rotation matrix (R) may be determined based on the orientation of the camera/robotic device. In some embodiments, the values of the transaction (T) may be determined based on the orientation and/or location of the camera/robotic device.

The term "wheel encoder" is used herein to refer to a sensor or device that collects and converts the angular position or motion of a wheel, shaft or axle of the robotic device to analog or digital output signals so as to provide information regarding the angle of rotation, number of rotations and/or rate of rotations of a wheel. A wheel encoder may use mechanical, optical or magnetic sensors to detect rotational position changes, count rotations and/or determine the rate of rotation. Information from a wheel encoder in combination with knowledge of the wheel diameter may be used by a processor of the robotic device to determine position, speed, and/or traveled distance information. Examples of wheel encoders include rotary encoders and shaft encoders. In some embodiments, the wheel encoder may include, or may be coupled to, a processor that is configured to generate a wheel encoder transaction (Tw) information structure based on the wheel encoder data.

As used herein, the term "optical flow sensor" refers to a sensor capable of measuring motion optically by detecting optical flow, and outputting measurements based on the optical flow or observed visual motion. An optical flow may identify or define the pattern of apparent motion of objects, surfaces, and edges in a visual scene caused by the relative motion between an observer (e.g., robotic device, etc.) and a scene. The optical flow sensor may output measurements or optical flow data/information that may be used to measure the motion of the robotic device across a surface. The optical flow information may also be used to measure visual motion or relative motion between the robotic device and other objects in the vicinity of the robotic device. In addition, the robotic device may use the optical flow information for motion detection, object segmentation, time-to-contact information, focus of expansion calculations, motion compensated encoding, stereo disparity measurements, and other similar information. In some embodiments, the optical flow sensor may be coupled to a processor that is configured to generate an optical flow sensor transaction (To) information structure based on the optical flow information. In some embodiments, the optical flow sensor may be an image sensor that is coupled to a processor that is programmed to run an optical flow algorithm. In some embodiments, the optical flow sensor may be vision chip that includes the image sensor and processor on the same chip or die. In some embodiments, the optical flow sensor may include an illumination source (e.g., a light-emitting diode (LED) laser) and an optical sensor configured to receive light from the source reflected by a surface.

Generally, a robotic device may employ VSLAM techniques to construct and update a map of an unknown environment while simultaneously keeping track of the robotic device's location within the environment. For example, a robotic device may be equipped with a monocular image sensor that captures images or frames of the environment. The robotic device may identify prominent objects or features within the captured image, estimate the dimensions and scale of the features in the image, compare the identified features to each other and/or to features in test images having known dimensions and scale, and identify correspondences based on the comparisons. Each correspondence may be a value set or an information structure that identifies a feature (or feature point) in one image as having a high probability of being the same feature in another image. Said another way, a correspondence may be a set of image points (e.g., a first point in a first image and a second point in a second image, etc.) that are in correspondence. The robotic device may produce a homography matrix information structure based on the identified correspondences, and use the homography matrix to determine its pose (e.g., position, orientation, etc.) within the environment.

To support VSLAM calculations, the robotic device may be equipped with sensors that gather movement or distance information useful for employing VSLAM techniques. The robotic device may use such movement or distance information to determine a distance between captured images or frames, and use such distance information in conjunction with the homography matrix to estimate the dimensions and scale of the objects in the frames. This in turn allows the robotic device to determine its pose with a higher degree of precision and accuracy than if the pose is determined solely based on captured images. For example, a robotic device may use wheel transaction data from a wheel encoder for determining the distance that the robotic device traveled between images/frames. The robotic device may also use wheel transaction data from a wheel encoder to determine a scale estimate value.

While a wheel encoder provides information that is useful for employing VSLAM techniques, such sensors are vulnerable to providing erroneous or outlier data due to wheel slippage that significantly hampers the device's ability to accurately determine pose. For example, a wheel rotation sensor, such as a wheel encoder, may be prone to erroneous output when the robotic device is moving on certain surfaces due to slippage, as may occur on an incline and/or slippery surfaces, or when there is resistance to wheel rotation (e.g., increased friction or another impediment to rotation). When a wheel encoder produces erroneous data, the robotic device may not be able to accurately determine the scale, perspective, or dimensions of the objects/features in the images. This, in turn, may hamper the robotic device's ability to determine its pose in the environment with a high degree of confidence, precision or accuracy.

In various embodiments, the robotic device may be equipped with an optical flow sensor that collects and/or produces optical flow sensor data that may be used by a processor to determine distance travelled. For example, the processor of the robotic device processor may be configured to receive a first image frame, receive a second image frame, generate homograph computation values based on the first image frame and the second image frame, receive optical flow sensor data from an optical flow sensor, determine a scale estimation value based on the homograph computation values and the optical flow sensor data, and use the scale estimation value to determine the robotic device pose.

In some embodiments, the processor of the robotic device may be configured to intelligently select and use the optical flow sensor data to replace inaccurate data collected from the wheel rotation sensor. For example, the distance traveled information from the optical flow sensor may be used by the processor to correct or replace outlier data, or improve the inaccurate of traveled distance information that is collected from a wheel encoder and/or other sensors in the robotic device. As a further example, the processor of the robotic device may be configured to detect slippage in the wheel or wheel encoder, and intelligently determine whether to use information collected from the wheel encoder, the optical flow sensor, or a combination thereof based on the level, degree, or magnitude of the detected slippage.

In some embodiments, the processor of the robotic device may be configured to capture optical flow images, detect feature points (e.g., corners, etc.) in the optical flow images, and apply the images/features point data to a Lucas-Kanade component/function to generate optical flow information. The optical flow information may characterize a transition or transaction between two images captured by an image sensor (e.g., camera) of the robotic device. The optical flow information may include information that identifies a speed (e.g., in pixels per unit time or pixels per image) and a direction of apparent movement for each feature point.

In some embodiments, the processor of the robotic device may be configured to use the optical flow sensor data collected from the optical flow sensor to calculate or estimate the scale in an image or between two images.

Various embodiments may be implemented within a robotic device operating within a variety of communication systems 100, an example of which is illustrated in FIG. 1A. The communication system 100 may include a robotic device 102, a base station 104, an access point 106, a communication network 108, and a network server computing device 110.

The robotic device 102 may be equipped with at least one spatial measurement device 103, such as a monocular camera that is suitable for obtaining the three-dimensional position of the robotic device 102 within the real word environment. The robotic device 102 may also be equipped with a wheel encoder 105 that measures the rotational movement of the wheel(s) and/or an optical flow sensor 107 configured to detect/measure movement over a surface based upon optical flow and output optical flow information that can be used by a processor to determine distances traveled, velocity, pixel speed, direction of travel, etc. In addition, the robotic device 102 may be equipped with any of a number of additional sensors, such as a camera, an orientation sensor, a monocular image sensor, an infrared sensor, an inertial measurement unit (IMU) and components thereof (e.g., accelerometer, gyroscope, magnetometer, etc.), a bumper sensor, etc.

The base station 104 may be configured to provide wireless communications over a wide area (e.g., macro cells), as well as small cells, which may include a micro cell, a femto cell, a pico cell, and other similar network access points. The access point 106 may include access points configured to provide wireless communications over a relatively smaller area. Other examples of base stations and access points are also possible. The robotic device 102 may communicate over the communication network 108 through wireless links provided by the base station 104 and the access point 106. For example, the robotic device 102 may communicate with the base station 104 over a wireless communication link 112, and with the access point 106 over a wireless communication link 114. The wireless communication links 112 and 114 may include a plurality of carrier signals, frequencies, or frequency bands, each of which may include a plurality of logical channels. The wireless communication links 112 and 114 may utilize one or more radio access technologies (RATs).

The network server computing device 110 may connect the communication network 108 to the Internet and/or to a network server. The robotic device 102 may send information to and/or receive communications from the network server computing device 110 via the communication network 108.

In various embodiments, the robotic device 102 may move in an environment 120 and use one or more sensors, such as the spatial measurement device 103, to capture at least one image of a target 125 in the environment 120. Navigation of a robotic device in various embodiments may be performed autonomously using systems that rely on VSLAM techniques. While the localization and mapping processes may be performed simultaneously, the processes may instead be performed sequentially, such as in a multiplexed fashion. For example, a VSLAM system may use the same data to both localize a robotic device within a map and to generate or update the map.

The VSLAM system may employ algorithms to solve the computational problem of constructing or updating a map of an unknown environment while simultaneously keeping track of a robotic device's location within the map. The VSLAM system may track a set of points through sensor inputs (e.g., camera or video frames), and use estimated locations of the tracked points to calculate the pose from which the robotic device could have observed or measured the points while simultaneously constructing or updating a map based on the tracked point locations in three-dimensional space.

In some embodiments, the robotic device may include a multicore processor configured to accomplish VSLAM by separating the localization and mapping functions onto different threads. For example, localization (i.e., current pose estimation) may be performed in real time on one thread, while the mapping thread runs processes in the background to minimize the differences between the tracked point locations and where the points are expected to be given the pose estimate (i.e., reprojection errors). On completion, the mapping thread may update the information used to track the set of points, and in turn the localization thread adds new observations to expand the map.

In some embodiments, the robotic device may be configured to apply VSLAM techniques to non-autonomous tasks. For example, a remotely-controlled device for bomb detection or search and rescue may implement VSLAM in a remote-control application to assist an operator to navigate around an environment.

In some embodiments, the robotic device may include various operational modes, such as a mode for manual control and another mode for an autonomous control. For example, a robotic device in the form of a vehicle may be manually-driven during an initial mapping stage, and later configured for autonomous control.

Figure 1B:
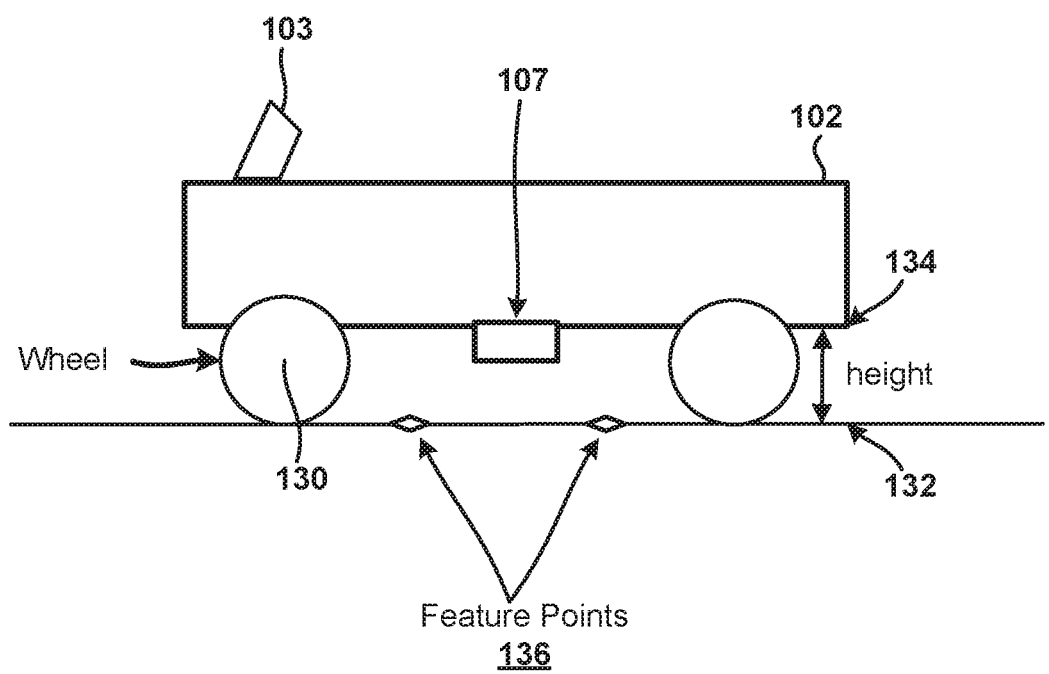
FIG. 1B is a block diagram of a robotic device of a ground-based design that utilizes one or more wheels driven by corresponding motors according to an embodiment.

FIG. 1B illustrates various components of a ground-based robotic device 102 that is suitable for implementing the various embodiments. With reference to FIGS. 1A and 1B, the robotic device 102 may utilize one or more wheels 130 driven by corresponding motors to provide locomotion to the robotic device 102. The robotic device 102 may be configured to determine or identify a height above or distance between a surface 132 (or the bottom portions of the wheels 130) and one or more points in the body frame 134 of the robotic device 102. In some embodiments, the robotic device may be preprogramed with the height information. In some embodiments, the robotic device may be configured to determine the height information based on information collected from one or more sensors (e.g., infrared sensor, etc.).

A processor of the robotic device 102 (e.g., a processor within the optical flow sensor 107) may be configured to identify feature points 136 on the surface 132 within images. A processor within the optical flow sensor 107 or the robotic device 102 may be configured to determine the distance and direction traveled by the robotic device 102 based on the height information and the identified feature points.

The robotic device 102 illustrated in FIGS. 1A and 1B is presented as a non-limiting example of a device that may utilize various embodiments, but is not intended to imply or require that various embodiments are limited to ground robotic devices. For example, various embodiments may be used with rotorcraft or winged robotic devices or waterborne robotic devices for applications in which an optical flow sensor can provide information regarding distances traveled, speed, etc.

Figure 1C:
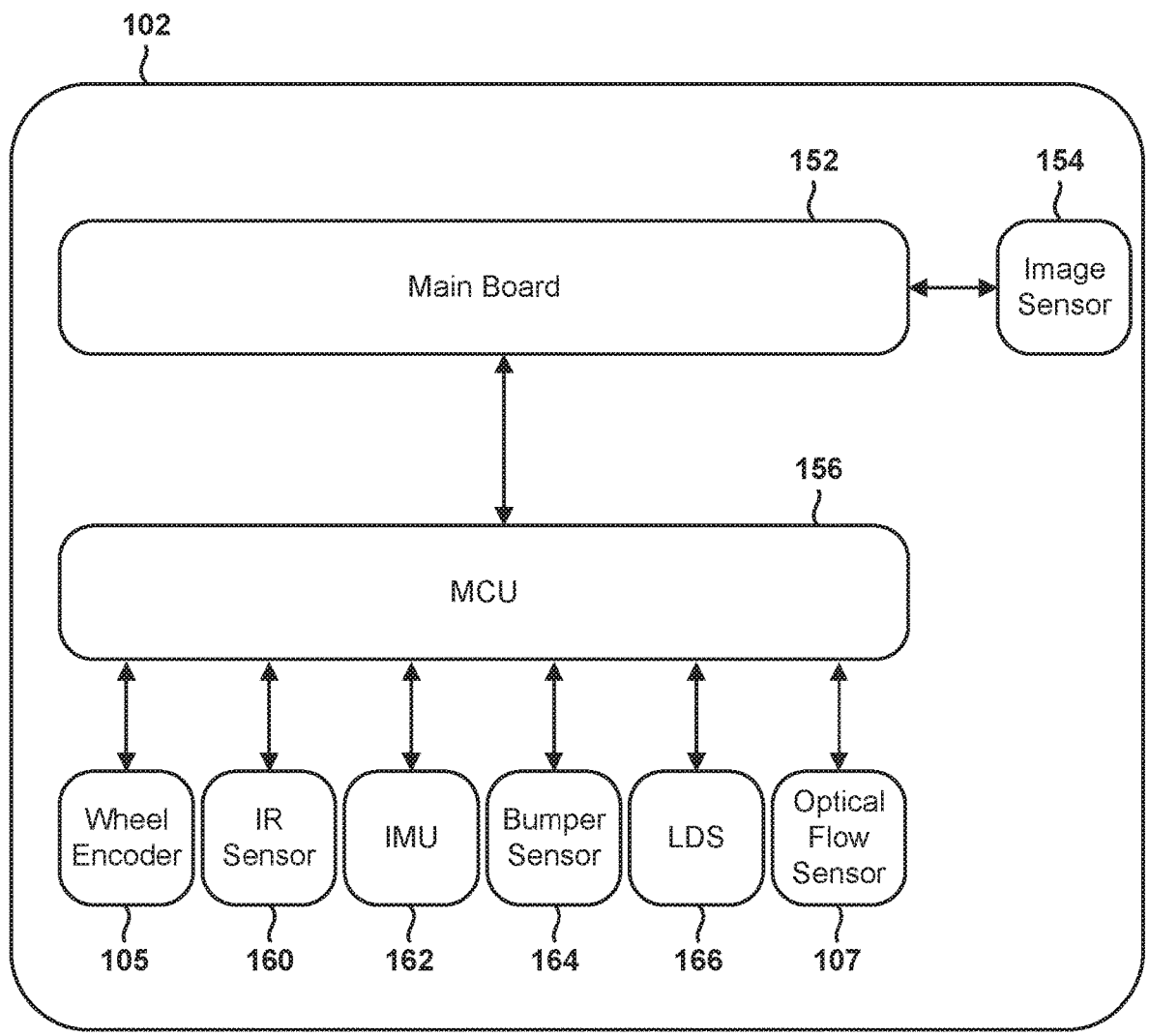
FIG. 1C is a system block diagram that illustrates the computer architecture and sensors that could be included in a robotic device that is configured to employ VSLAM techniques in accordance with the various embodiments.

FIG. 1C illustrates a computer architecture and various sensors that may be included in a robotic device 102 that is configured to employ VSLAM techniques in accordance with the various embodiments. In the example illustrated in FIG. 1C, the robotic device 102 includes a main board component 152, and image sensor 154, a microcontroller unit (MCU) 156, a wheel encoder 105, an infrared (IR) sensor 160, an inertial measurement unit (IMU) 162, a bumper sensor 164, a laser distance sensor (LDS) 166, and an optical flow sensor 107.

The sensors 154, 160-168 may gather information that is useful for employing VSLAM techniques in the robotic device 102. For example, a wheel encoder 105 and/or an optical flow sensor 107 may collect information suitable for determining the distance that the robotic device 102 has traveled between images/frames. The wheel encoder 105 and/or the optical flow sensor 107 may also collect information suitable for determining or generating a transaction information structure that is suitable for estimating scale. The robotic device 102 may use this information in conjunction with information collected from other sensors 160-168 to better estimate the dimensions and scale of the objects in the frames captured by the image sensor 154. This in turn allows the robotic device 102 to determine its pose with a higher degree of precision and accuracy.

The optical flow sensor 107 may be configured to collect and/or produce optical flow sensor data that may be used to correct, replace, or improve inaccurate and/or outlier distance measurement data that is collected from other the sensors 154, 160-166 in the robotic device. A processor in the main board component 152 and/or the MCU 156 may be configured to intelligently select and use the optical flow sensor data from the optical flow sensor 107 to replace inaccurate data collected from the wheel encoder 105. Alternatively, the processor may be configured to detect slippage based on the information collected from the sensors 154, 160-168, and intelligently determine whether to use information collected from a wheel encoder 105, the optical flow sensor 107, or a combination thereof.

Figure 2:
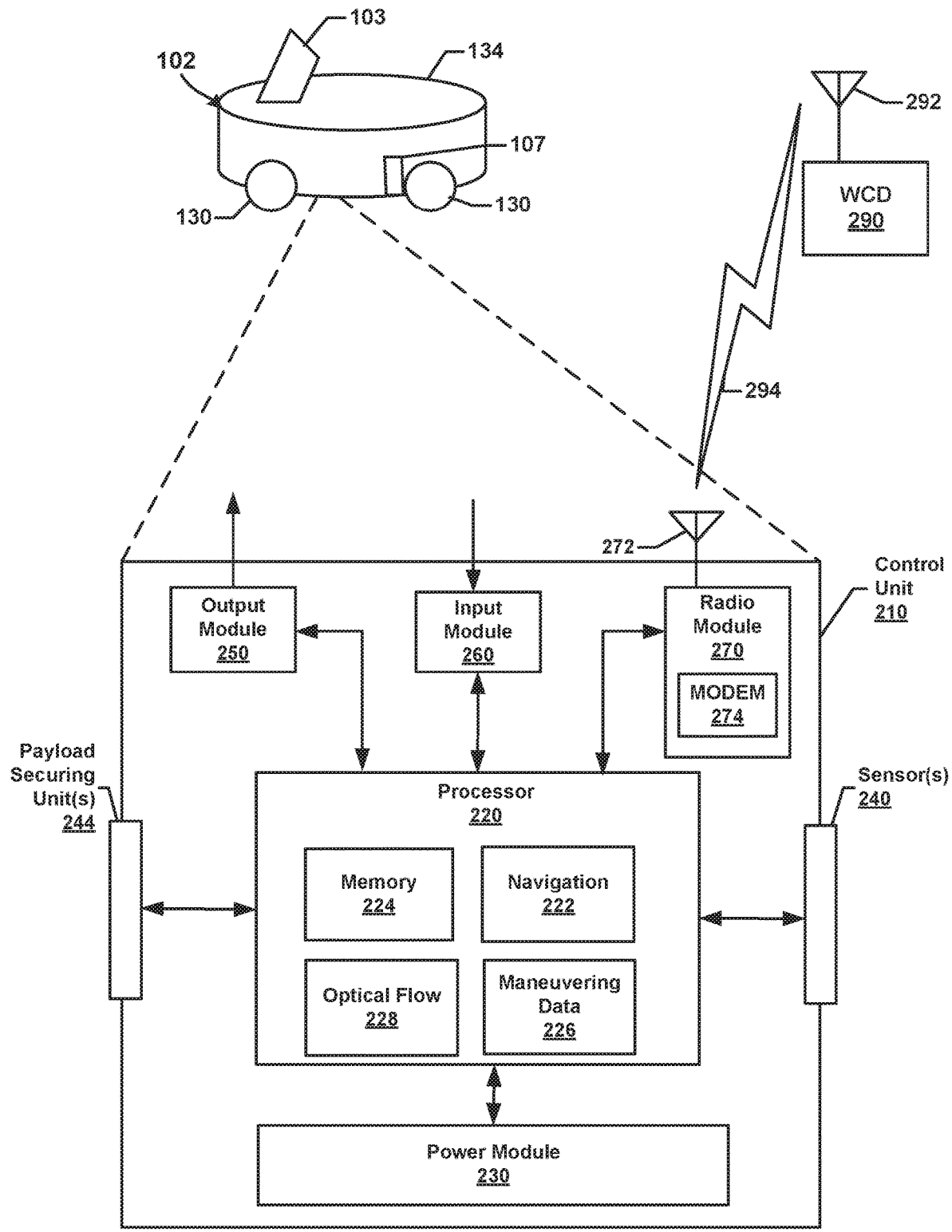
FIG. 2 is a component block diagram illustrating components of a robotic device suitable for use with various embodiments.

FIG. 2 illustrates various components of a robotic device 102 that could be configured to estimate scale and determine pose in accordance with the various embodiments. With reference to FIGS. 1A-2, the robotic device 102 may include a number of wheels 130, a body frame 134, at least one spatial measurement device 103, and an optical flow sensor 107.

The spatial measurement device(s) 103 may be the same as or similar to the spatial measurement device 103. In some embodiments, the spatial measurement device(s) 103 may include, for example, systems configured as raw range scan sensors, or feature-based systems configured to recognize landmarks from scans or images. For example, a laser-based scanner (e.g., Light Detection and Ranging (LiDAR)) or sonar-based system may be used to detect and measure distances to various features and landmarks in the environment. In some embodiments, features and landmarks may be identified within images taken by an image sensor (e.g., cameras, optical readers, etc.). In some embodiments, any of a number of other devices capable of detecting nearby features and landmarks may also be implemented as a spatial measurement device.

The body frame 134 may provide structural support for the motors and their associated wheels 130 as well as for the spatial measurement device 103. For ease of description and illustration, some detailed aspects of the robotic device 102 are omitted such as wiring, frame structure interconnects, or other features that would be known to one of skill in the art. While the illustrated robotic device 102 has wheels 130, this is merely exemplary and various embodiments may include any variety of components to provide propulsion and maneuvering capabilities, such as treads, paddles, skids, or any combination thereof or of other components.

The robotic device 102 may further include a control unit 210 that may house various circuits and devices used to power and control the operation of the robotic device 102. The control unit 210 may include a processor 220, a power component 230, sensors 240, one or more payload securing units 244, an output component 250, an input component 260, and a radio component 270.

The processor 220 may be configured with processor-executable instructions to control travel and other operations of the robotic device 102, including operations of various embodiments. The processor 220 may include or be coupled to a navigation unit 222, a memory 224, a maneuvering data component 226, and an optical flow sensor 228. The processor 220 and/or the navigation unit 222 may be configured to communicate with a server through a wireless connection (e.g., a cellular data network) to receive data useful in navigation, provide real-time position reports, and assess data.

The processor 220 may also receive data from the optical flow sensor 228 and use such data to determine, identify or define the pattern of apparent motion of objects, surfaces, and edges in the environment caused by the motion of the robotic device 202. In some embodiments, the processor 220 may be configured to detect wheel slippage, and determine whether to use information collected from the wheel rotation sensor, the optical flow sensor 228, or a combination thereof based on the detected slippage.

The maneuvering data component 226 may be coupled to the processor 220 and/or the navigation unit 222, and may be configured to provide travel control-related information such as orientation, attitude, speed, heading, and similar information that the navigation unit 222 may use for navigation purposes, such as dead reckoning between Global Navigation Satellite System (GNSS).

The maneuvering data component 226 may receive input from one or more sensors 240, such as an IMU or similar sensors (e.g., accelerometer, a gyroscope, etc.). In some embodiments, the sensor(s) 240 providing input to the maneuvering data component 226 may include or overlap with the one or more spatial measurement devices 103. The input to the maneuvering data component 226 may provide data regarding the orientation and accelerations of the robotic device 102 that may be used in navigation and positioning calculations, as well as providing data used in various embodiments.

The processor 220 may further receive additional information from one or more other types of sensors 240 (e.g., a camera, which may be a monocular camera). In some embodiments, the sensor(s) 240 may include one or more optical sensors capable of detecting infrared, ultraviolet, and/or other wavelengths of light. In some embodiments, the sensor(s) 240 may include and/or overlap with the range measurement device(s) 206. In some embodiments, the sensor(s) 240 may include at least one sensor that provides motion feedback to the processor 220, for example, a wheel encoder, a contact or pressure sensor that provides a signal indicative of contact with a surface, optical flow sensor, etc. The sensor(s) may also include a radio frequency (RF) sensor, a barometer, a sonar emitter/detector, a radar emitter/detector, a microphone or another acoustic sensor, or another sensor that may provide information usable by the processor 220 for movement operations as well as navigation and positioning calculations.

In some embodiments, the payload-securing units 244 may include an actuator motor that drives a gripping and release mechanism and related controls that are responsive to the control unit 210 to grip and release a payload in response to commands from the control unit 210.

The power component 230 may include one or more batteries that may provide power to various components, including the processor 220, the sensors 240, the payload-securing unit(s) 244, the drive motors coupled to the wheels 130, the output component 250, the input component 260, and the radio component 270. The power component 230 may be rechargeable. The processor 220 may be configured with processor-executable instructions to control the charging of the power component 230, such as by executing a charging control algorithm using a charge control circuit. Alternatively or in addition, the power component 230 may be configured to manage its own charging. The processor 220 may be coupled to the output component 250, which may output control signals for managing motors that drive the wheels 130 and other components.

The robotic device 102 may be maneuvered by controlling individual motors driving the wheels 130 as the robotic device 102 progresses toward a destination. The processor 220 may receive data from the navigation unit 222 and use such data in order to determine the present position and orientation of the robotic device 102, as well as the appropriate course towards the destination or intermediate sites. In various embodiments, the navigation unit 222 may include a GNSS receiver system (e.g., one or more global positioning system (GPS) receivers) enabling the robotic device 102 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, robotic vehicles, etc.

The radio component 270 may include a modem 274 and a transmit/receive antenna 272. In some embodiments, the radio component 270 may be configured to conduct wireless communications with a variety of wireless communication devices (e.g., a wireless communication device (WCD) 290), examples of which include a wireless telephony base station or cell tower (e.g., the base station 104), a network access point (e.g., the access point 106), a beacon, a smartphone, a tablet, or another computing device (e.g., 110) with which the robotic device 102 may communicate. In some embodiments, the processor 220 may establish a bi-directional wireless communication link 294 via the modem 274 and the antenna 272 of the radio component 270 and the wireless communication device 290 via a transmit/receive antenna 292. In some embodiments, the radio component 270 may be configured to support multiple connections with different wireless communication devices using different radio access technologies.

In various embodiments, the control unit 210 may be equipped with an input component 260, which may be used for a variety of applications. For example, the input component 260 may receive images or data from an onboard camera or sensor, or may receive electronic signals from other components (e.g., a payload).

Figure 3:
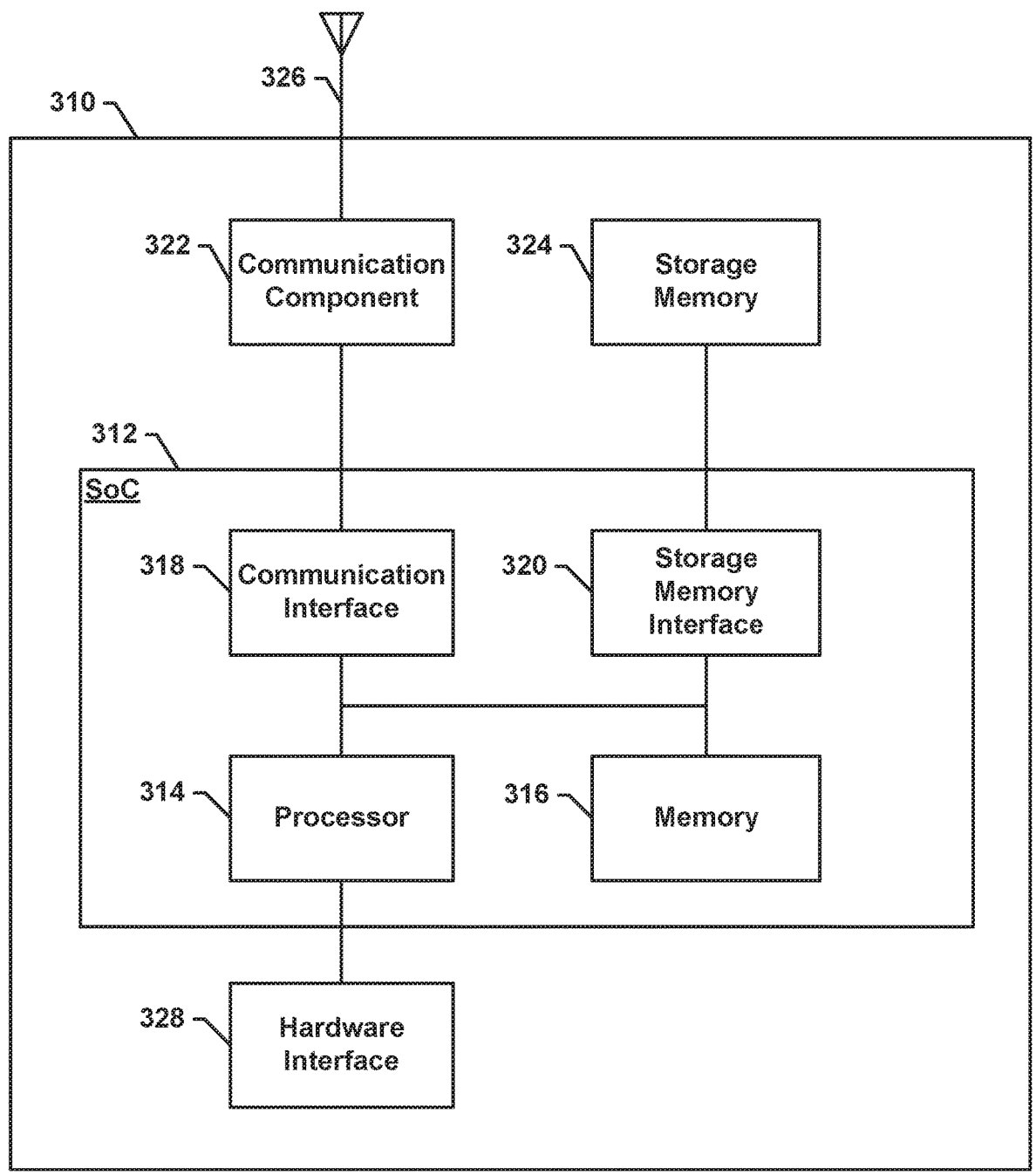
FIG. 3 is a component block diagram illustrating a processing device suitable for use in robotic devices implementing various embodiments.

While various components of the control unit 210 are illustrated in FIG. 2 as separate components, some or all of the components (e.g., the processor 220, the output component 250, the radio component 270, and other units) may be integrated in a single processing device 310, an example of which is illustrated in FIG. 3.

FIG. 3 illustrates a processing device 310 that could be configured to be used in a robotic device. With reference to FIGS. 1A-3, the processing device 310 may be configured to be used in the robotic device and may be configured as or including a system-on-chip (SoC) 312. The SoC 312 may include (but is not limited to) a processor 314, a memory 316, a communication interface 318, and a storage memory interface 320. The processing device 310 or the SoC 312 may further include a communication component 322, such as a wired or wireless modem, a storage memory 324, an antenna 326 for establishing a wireless communication link, and/or the like. The processing device 310 or the SoC 312 may further include a hardware interface 328 configured to enable the processor 314 to communicate with and control various components of a robotic device. The processor 314 may include any of a variety of processing devices, for example any number of processor cores.

The term "system-on-chip" (SoC) is used herein to refer to a set of interconnected electronic circuits typically, but not exclusively, including one or more processors (e.g., 314), a memory (e.g., 316), and a communication interface (e.g., 318). The SoC 312 may include a variety of different types of processors 314 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SoC 312 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 312 may include one or more processors 314. The processing device 310 may include more than one SoC 312, thereby increasing the number of processors 314 and processor cores. The processing device 310 may also include processors 314 that are not associated with a SoC 312 (i.e., external to the SoC 312). Individual processors 314 may be multicore processors. The processors 314 may each be configured for specific purposes that may be the same as or different from other processors 314 of the processing device 310 or SoC 312. One or more of the processors 314 and processor cores of the same or different configurations may be grouped together. A group of processors 314 or processor cores may be referred to as a multi-processor cluster.

The memory 316 of the SoC 312 may be a volatile or non-volatile memory configured for storing data and processor-executable instructions for access by the processor 314. The processing device 310 and/or SoC 312 may include one or more memories 316 configured for various purposes. One or more memories 316 may include volatile memories such as random access memory (RAM) or main memory, or cache memory.

Some or all of the components of the processing device 310 and the SoC 312 may be arranged differently and/or combined while still serving the functions of the various aspects. The processing device 310 and the SoC 312 may not be limited to one of each of the components, and multiple instances of each component may be included in various configurations of the processing device 310.

As described, a robotic device in various embodiments may utilize VSLAM processes in order to navigate and in order to carry out tasks. Such processes may include mapping the spatial information of landmarks within the environment, as well as representing the robotic device's pose (i.e., position and orientation) relative to the mapped environment.

VSLAM algorithms take account of a variety of parameters, such as sensor information, map representation, device dynamics, environmental dynamics, and the integration of sensor measurements and the robot's control system over time. Mapping the spatial information of the environment generally requires employing spatial sensors (e.g., spatial measurement device(s) 103) to which VSLAM algorithms may be applied. For example, landmarks may be extracted from images obtained by one or multiple cameras, which may be any of a variety of configurations (e.g., monocular, stereo vision, multiple camera, etc.).

Localization of the robotic device may be performed by obtaining sensory information regarding the position and orientation (i.e., pose) of the device within the generated map.

For example, for vehicle-type robotic devices, pose information may be determined using information obtained from wheel encoders, which measure the rotational movement of the wheel(s) and/or optical flow sensors, which measure distances traveled based on the flow of features observed in a light or image sensor. The robotic device may also use a GPS sensor, which allows acquisition of pose information.

Figure 4:
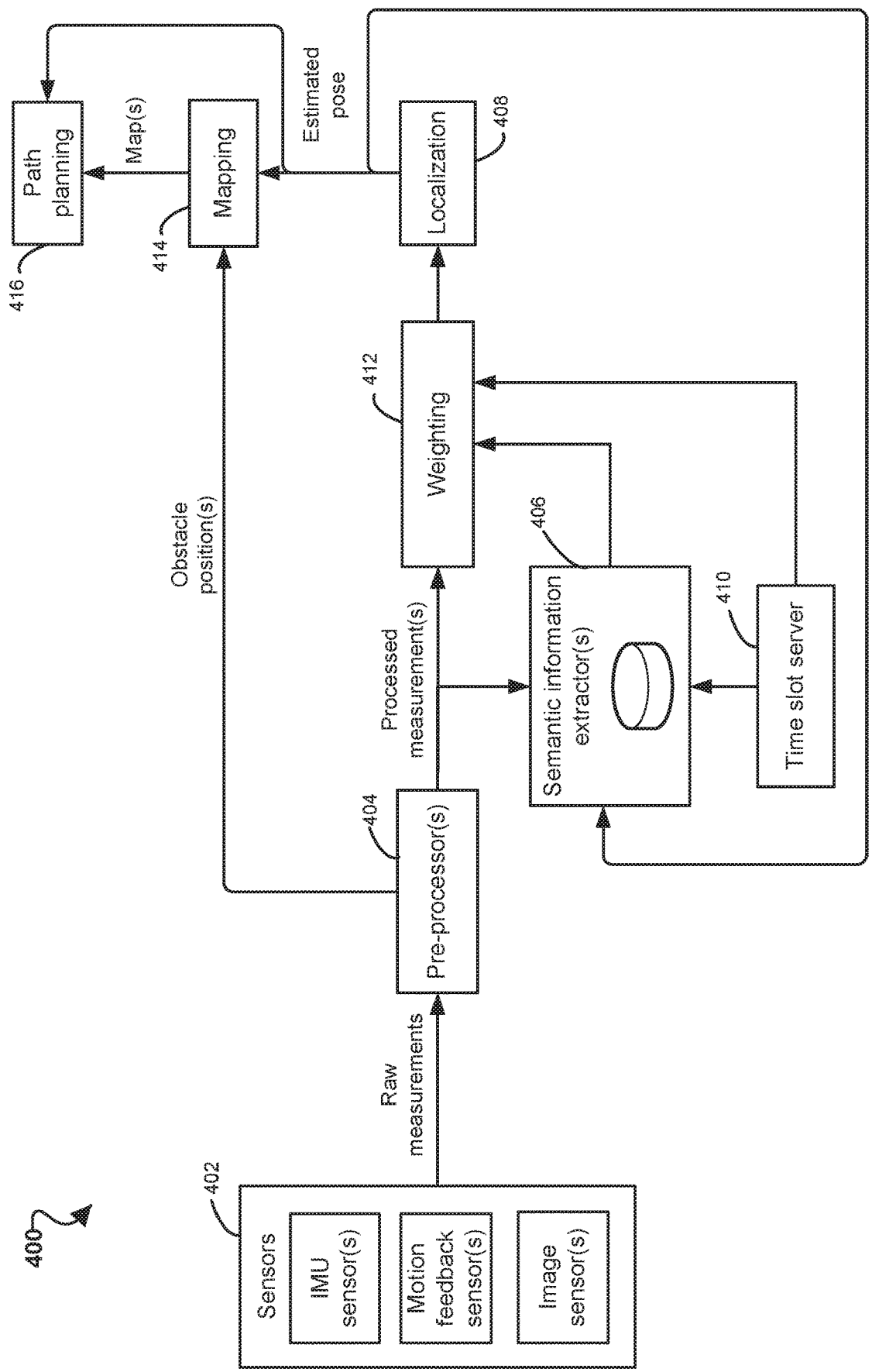
FIG. 4 is a component block diagram illustrating a navigation system suitable for use in robotic devices implementing various embodiments.

FIG. 4 illustrates an example navigation system that is suitable for use in accordance with the various embodiments. With reference to FIGS. 1A-4, the navigation system 400 may be implemented on a processor of a robotic device (e.g., 102, 200), such as a ground vehicle (e.g., car, vacuum robot, etc.), an aerial vehicle (e.g., UAV), etc.

In the navigation system 400, inputs may be received from multiple sensors in order to enable the system to perform localization, map generation, and path planning for VSLAM processes on the robotic device.

In some embodiments, sensors 402 may include at least one IMU sensor for detecting orientation or other maneuvering data. As described, the sensor(s) 402 may also include at least one motion feedback sensor, such as a wheel encoder, optical flow sensor, pressure sensor, or other collision or contact-based sensor. Further, the sensor(s) 402 may include at least one image sensor, such as a visual camera, an infrared sensor, a sonar detector, etc.

Raw measurement data from the sensors 402 may be provided to a pre-processor(s) 404. Pre-processing performed by the pre-processor 404 may include removal of outliers and noise suppression, as well as landmark/feature extraction, data association, etc. In various embodiments, the pre-processor(s) 404 may output processed measurements relating to position and orientation of the robotic device (e.g., acceleration, velocity, odometry information, etc.).

While shown together, the pre-processor(s) 404 may represent multiple pre-processors that each correspond to a different sensor or group of sensors. For example, some pre-processors may be configured to receive and jointly process raw measurements from multiple sensors, or may be configured to receive and process raw measurements from a single sensor 402.

Processed measurements from each pre-processor(s) 404 may be provided to semantic information extractor(s) 406, which may obtain semantic information about each sensor(s) 402 associated with the corresponding pre-processor(s) 404. Specifically, the semantic information extractor(s) 406 may be configured to identify and record specific adverse events relating to the associated sensor(s) 402. Such adverse events may include, for example, an outlier data measurement, a string of blank measurements from a sensor, data indicating a condition of the robotic device (e.g., device stuck, collision with obstacle, etc.), or any other measurement indicating diminished performance by one or more sensors.

In some embodiments, the semantic information extractor(s) 406 may be configured to determine whether data from the wheel encoder (e.g., 105) includes errors or inaccurate information due to conditions such slippage or resistance. In some embodiments, the semantic information extractor(s) 406 may be configured to compute a confidence value that quantifies the level of confidence that the collected sensor data falls within an accuracy tolerance interval. Similarly, the semantic information extractor(s) 406 may be configured to compute an accuracy probability value that identifies the degree or likelihood that information collected from a sensor (e.g., a wheel encoder 105, etc.) is accurate. For example, the computed accuracy probability value may identify the likelihood that distance information collected from the wheel encoder over a time period is accurate (e.g., within one meter, decimeter, centimeter, millimeter, etc.) of the actual distance that the robotic device traveled during that time period.

In various embodiments, the semantic information extractor(s) 406 may store and update semantic information for each associated sensor 402. Such semantic information may be represented in any of a number of data structures, which may be stored in a database in local storage on the robotic device. Examples of data structures that may be used to represent the semantic information include, for example, a data table/array, tree, etc.

The type of data structure employed may be selected for efficiency based on the volume of semantic information collected. In some embodiments, semantic information that is relatively dense across time and space may be represented in a data array. For example, semantic information based on recording outlier sensor data may be best represented in a data array. In some embodiments, semantic information that is relatively sparse across time and space may be represented in a data tree. For example, semantic information based on recording events in which the robotic device is stuck may be best represented in a data tree.

In some embodiments, local storage may be a separate storage device, examples of which may include universal serial bus (USB) drives, memory cards, solid-state drives (SSDs), hard disk drives (HDDs), floppy disks, optical disks, magnetic tapes, and the like. For example, the local storage may be a removable storage device such as a memory card, for example, a PC Card, CompactFlash, SmartMedia, Memory Stick, Memory Stick Duo, Memory Stick PRO Duo, Miniature Card, Multimedia Card (MMC), Reduced Size Multimedia Card (RS-MMC), MMCmicro Card (MMCmicro), PS2 card, Secure Digital (SD) card, SxS, Universal Flash Storage (UFS), miniSD, microSD, XD-Picture Card, Intelligent Stick (iStick), etc. In some embodiments, the local storage may be a partition or part of a memory device (e.g., 224).

An adverse event may be detected in various embodiments by comparing the processed measurement s from the corresponding pre-processor 406 with a current estimated pose for the robotic device. In various embodiments, feedback from a localization component 408 for VSLAM may provide the current estimated pose to each semantic information extractor(s) 406. If the difference between a pose indicated by the processed measurement(s) from the pre-processor 404 and the current estimated pose is greater than a pre-determined threshold, the semantic information extractor 406 may record an adverse event for the related one or more associated sensor(s) 402. Specifically, the semantic information extractor 406 may identify a timeslot during which the adverse event occurred within a time period by accessing a timeslot server 410. In some embodiments, the timeslot server 410 may maintain independent time period and timeslot instructions for each semantic information extractor 406.

Using the current estimated pose and the timeslot, the semantic information extractor 406 may update the stored semantic information for the related one or more associated sensor(s) 402. The semantic information extractor 406 may periodically seek to identify patterns in the adverse event occurrence across timeslots and/or poses for each associated sensor 402, such as when each time period ends. Any such identified patterns may be provided to a weighting factor component 412, which may receive the processed measurement(s) from the corresponding pre-processor 404. In various embodiments, the weighting component 412 may adjust the weight given to data (i.e., processed measurement(s)) from the related associated sensor(s) 402 based on the identified pattern, confidence value, or accuracy probability value. Such adjustment may involve lowering the weighting factor of data from a sensor 402 for a specific time duration, or when the robotic device is located in a particular spatial region.

After adjusting weighting factor(s) based on semantic information, the processed measurements may be provided to the localization component 408. As discussed, the localization component 408 may generate a current estimated pose for the robotic device as part of VSLAM processes. In addition to providing the current estimated pose to the semantic information component(s) 406, the location component 408 may provide such information to a mapping component 414 and to a path planning component 416. In various embodiments, the pre-processing component(s) 404 may provide data about the position of obstacles in the local environment to the mapping component 414. The pre-processor(s) 404 that provide such obstacle position information, as well as their associated sensor(s) 402, may be either the same as or different from those used to provide processed measurements to the semantic information extractor(s) 406. In some embodiments, the object position information may be computed based on an identified point set and/or landmarks in the local environment. In some embodiments, the mapping component 414 may utilize the current estimated pose and obstacle position information to construct at least one map. For example, in using VSLAM techniques, the mapping component 414 may generate a map with spatial representations of the local environment for navigation, as well as update mapping information relative to the robotic device about features (e.g., landmarks).

The map(s) generated by the mapping component 414 may be provided to the path planning component 416. The path planning component 416 may use the received map(s) and the current estimated pose information to select, create, or update a navigation path for the robotic device.

In the various embodiments, a processor of a robotic device (e.g., the processor 220, etc.) and hardware components and/or software components of the robotic device may be configured to capture and process an image using an image sensor. For example, an image sensor of the robotic device may capture images of target objects. The target objects may be located or arranged such that the robotic device image sensor can easily acquire images of at least two of the target objects. If the image sensor is unable to obtain an image of two or more of the target objects, the processor may instruct the various actuators to move the robotic device to another location or pose and try again.

The processor may execute VSLAM using the captured images of the target objects. For example, the processor may identify features within each of the captured images and may attempt to track those features between subsequent images.

In some embodiments, the processor may determine whether the rotation angle of the image sensor can be determined. The processor may attempt to calculate the angle of rotation between the robotic device and the target objects. Because the dimension, position, and location of the target objects is known, and stored in a memory of the robotic device, the processor may be able to calculate the robotic device's angle of rotation with reference to the target objects using the captured images. In response to determining that the rotation angle of the image sensor cannot be determined, the processor may capture additional images of the target objects. Thus, if the processor is unable to determine the robotic device's angle of rotation with reference to the target objects, the robotic device may return to capturing images and performing VSLAM until an image is found from which the angle of rotation may be calculated.

In response to determining that the rotation angle of the image sensor can be determined, the processor may select a captured image having two or more target objects in a field of view of the image. The processor may determine an image scale based, at least in part, on a location of the target objects within the selected image. Because the dimension and position of the target objects relative to each other is already known, the processor of the robotic device may calculate the scale of the images. The processor may compare the size and distribution of the target objects in the selected image to the stored dimension and position information for the target objects to determine the scale of the objects in the image.

The processor may determine whether the selected image includes more than two target objects. This determination may be made during the selection of the captured image, during feature identification, or thereafter. If the selected image contains more than two target objects, additional information may be gained from the image.

In response to determining that the selected image does not include more than two target objects, the processor may continue capturing images of the target objects. On the other hand, in response to determining that the selected image includes more than two target objects, the processor may determine a rotation angle correction in response to determining that the selected image includes more than two target objects.

If the target objects are positioned within the same plane, then homography matrix-based techniques may be employed by the processor to determine the rotation angle correction. If the target objects are not positioned in the same plane, then fundamental matrix techniques may be employed by the processor to determine the rotation angle correction.

Figure 5A:
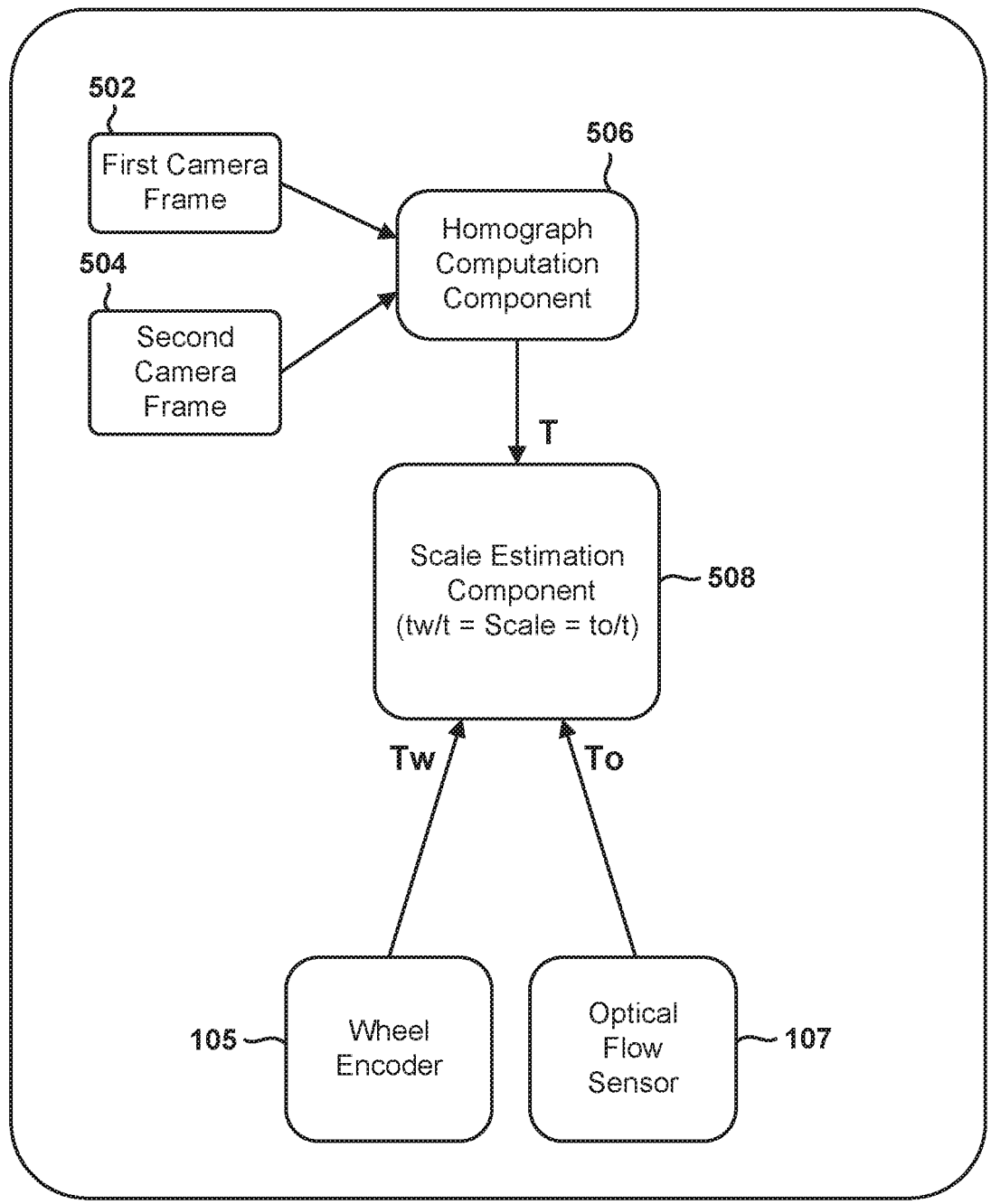
FIGS. 5A and 5B are a block diagrams illustrating a various operations and functional components in a robotic device that is configured to employ VSLAM techniques that include VSLAM scale estimation using optical flow sensor in accordance with an embodiment.

FIG. 5A illustrates various operations and functional components in a robotic device 102 configured to employ VSLAM techniques that include VSLAM scale estimation using optical flow sensor in accordance with an embodiment. In the example illustrated in FIG. 5A, the robotic device 102 includes a wheel encoder 105, an optical flow sensor 107, a homograph computation component 506, and a scale estimation component 508.

The homograph computation component 506 may be configured to generate or compute an initial homography matrix (H). In some embodiments, the homograph computation component 506 may be configured to work in conjunction with the processor of the robotic device to identify prominent objects/features in a first camera frame 502, identify prominent objects/features in a second camera frame 504, and compare the identified features to each other and/or to features in test images having known dimensions and scale. The homograph computation component 506 may identify correspondences based on the comparisons. The homograph computation component 506 may use the identified correspondences to generate or produce the initial homography matrix (H) or homograph computation.

As mentioned above, in some embodiments, the homograph computation component 506 may be configured to generate or compute a homography matrix (H) or value. In various embodiments, the homography matrix (H) may include a set of values, a vector, a vector set, a map, a linear map, a rectangular array, a multidimensional array, or other similar information structure(s). In an embodiment, the homography matrix may be a 3×3 matrix with 8 degrees of freedom (DoF) that is calculated from four (4) point correspondences (e.g., (p1, p1'), (p2, p2'), (p3, p3'), and (p4, p4')).

The homography matrix (H) may be computed via a function call, such as "Mat H=findHomography (points_sourceImage, points_destinationImage)" or "H=Mat findHomography ((InputArray srcPoints, InputArray dstPoints, int method=0, double ransacReprojThreshold=3, OutputArray mask=noArray ( )." In some embodiments, the homography matrix (H) may be:

$$H = \begin{bmatrix} h11 & h12 & h13 \\ h21 & h22 & h23 \\ h31 & h32 & h33 \end{bmatrix}$$

The projected coordinates p (x', y') of a point p (x,y) may be computed from the homography matrix (H) using the following formula:

$$\begin{bmatrix} x' \\ y' \\ 1 \end{bmatrix} \sim H \begin{bmatrix} x \\ y \\ 1 \end{bmatrix}$$

In some embodiments, the homograph computation component 506 may be configured to perform a singular value decomposition (SVD) operation on a homography matrix (H) to compute or generate a transaction information structure (T) that identifies or estimates a location and/or an orientation for the robotic device based on the images.

In some embodiments, the system may be configured to compute the affinity, affine map, affine coordinates, or affine transformation via a function call, such as "Mat getAffineTransform (const Point2f src [ ], const Point2f dst [ ])."

The scale estimation component 508 may be configured to receive a homograph computation (e.g., homography matrix (H), transaction (T), etc.) from the homograph computation component 506, wheel data from the wheel encoder 105, and optical flow information from the optical flow sensor 107.

In some embodiments, the received wheel transaction data and/or optical flow information may include information identifying the direction and distance moved by the robotic device between a first image frame and a second image frame. In some embodiments, the received wheel transaction data and/or optical flow information may include information identifying the distance (e.g., Euclidean distance, etc.) that the robotic device traveled between the first image frame and the second image frame. In some embodiments, the received wheel transaction data and/or optical flow information may include information identifying the length of the shortest path between a first location where the first image frame was captured and a second location where the second image frame was captured. In some embodiments, the received wheel data may include a wheel encoder transaction (Tw) information structure. In some embodiments, the received optical flow information may include an optical flow sensor transaction (To) information structure.

The scale estimation component 508 may estimate the scale of the objects, features, images or frames based on the received information (e.g., homograph computation, information identifying a displacement of the robotic device 102 between the first and second image frames, etc.). For example, the scale estimation component 508 may determine scale based on a combination of the transaction (T) computed by the homograph computation component 506 and the wheel encoder transaction (Tw) received from the wheel encoder. As another example, the scale estimation component 508 may use the information received from the homograph computation component 506 to generate a first transaction (T), use the information received from the wheel encoder 105 to generate a second transaction (Tw), and determine scale(s) based on the first and second transactions (e.g., s=Tw/T).

In an embodiment, the computing device may be configured to compute the values included in the wheel encoder transaction (Tw) by invoking a function, such as get WheelOdom (position, orientation). The computing device may integrate the position over a short time period corresponding to a camera frame the time between camera frames. In an embodiment, the computing device may be configured to compute the value of the wheel encoder transaction (Tw) as follows:

$$\int_t (x^2 + y^2 + z^2)^{1/2} = Tw \rightarrow \sum_{i=0}^{t}(\Delta x^2 + \Delta y^2 + \Delta z^2)^{1/2} * K = Tw$$

where $K=\pm 1$ based on the symbol of $\Delta x$

The scale estimation component 508 may also determine scale based on a combination of the homograph computation (e.g., camera transaction T) and optical flow information (e.g., optical flow sensor transaction To). For example, the scale estimation component 508 may determine scale based on a combination of the transaction (T) computed by the homograph computation component 506 and the optical flow sensor transaction (To) received from the optical flow sensor 107. As another example, the scale estimation component 508 may use the information received from the homograph computation component 506 to generate a first transaction (T), use the information received from the optical flow sensor 107 to generate another transaction (To), and determine scale(s) based on the determined transactions (e.g., s=To/T).

A processor in the robotic device may use the determined scale to employ homography matrix-based techniques for determining robotic device pose, the rotation angle correction, and/or other similar information. For example, the processor may use the differences in scale between the objects/features in the first and second camera frames in conjunction with displacement information to determine its current location and orientation.

Figure 5B:
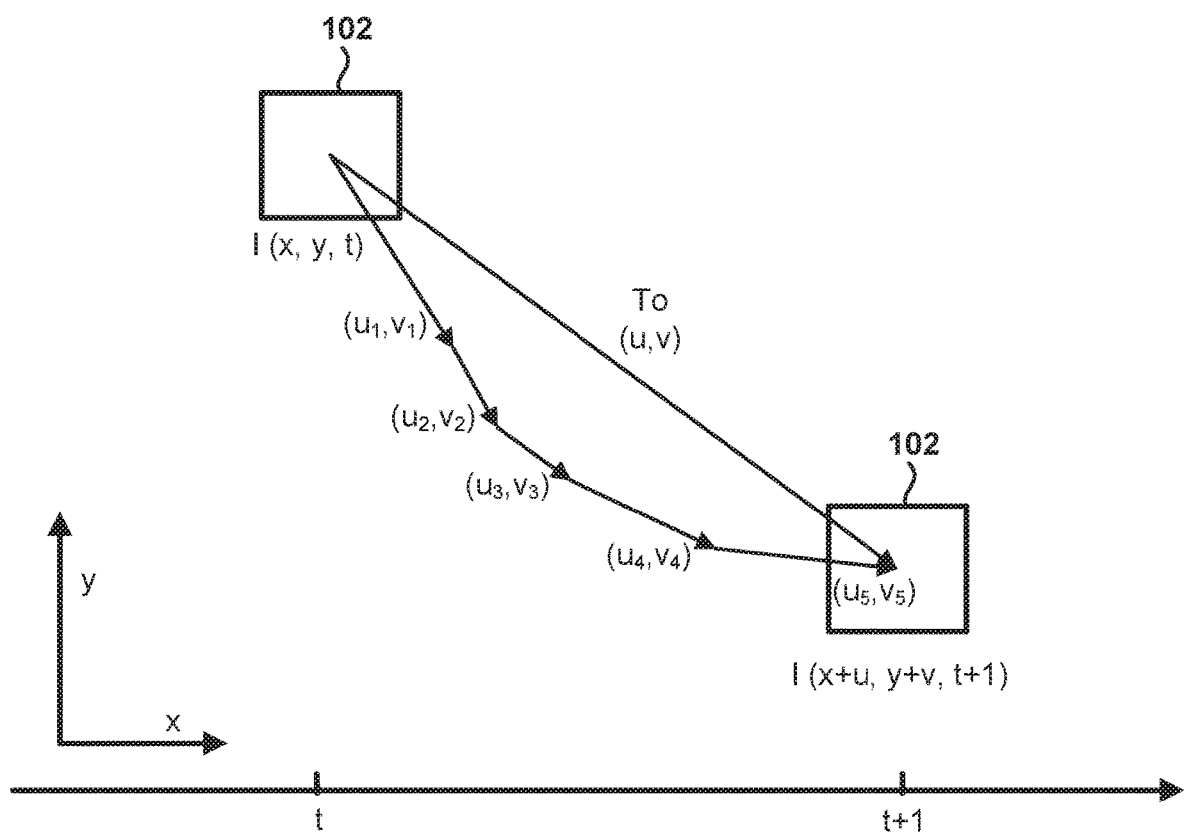

FIG. 5B illustrates a system for computing the transaction from time (t) to time (t+1) based on optical flow information. In the example illustrated in FIG. 5B, the robotic device 102 moves from location (x,y) at time t to location (x+u, y+v) at time t+1. Between time t and time t+1, the optical flow sensor captures a first image at location $(u_1, v_1)$, a second image at location $(u_2, v_2)$, a third image at location $(u_3, v_3)$, a fourth image at location $(u_4, v_4)$, and a fifth image at location $(u_5, v_5)$. The track or displacement between time t and time t+1 is (u, v), which is represented by optical flow sensor transaction (To). Based on a homography computation, the system may compute the transaction (T) of the main camera of the robotic device over the same time period. In this example, the scale(s) of the robotic device is To/T.

Figure 5C:
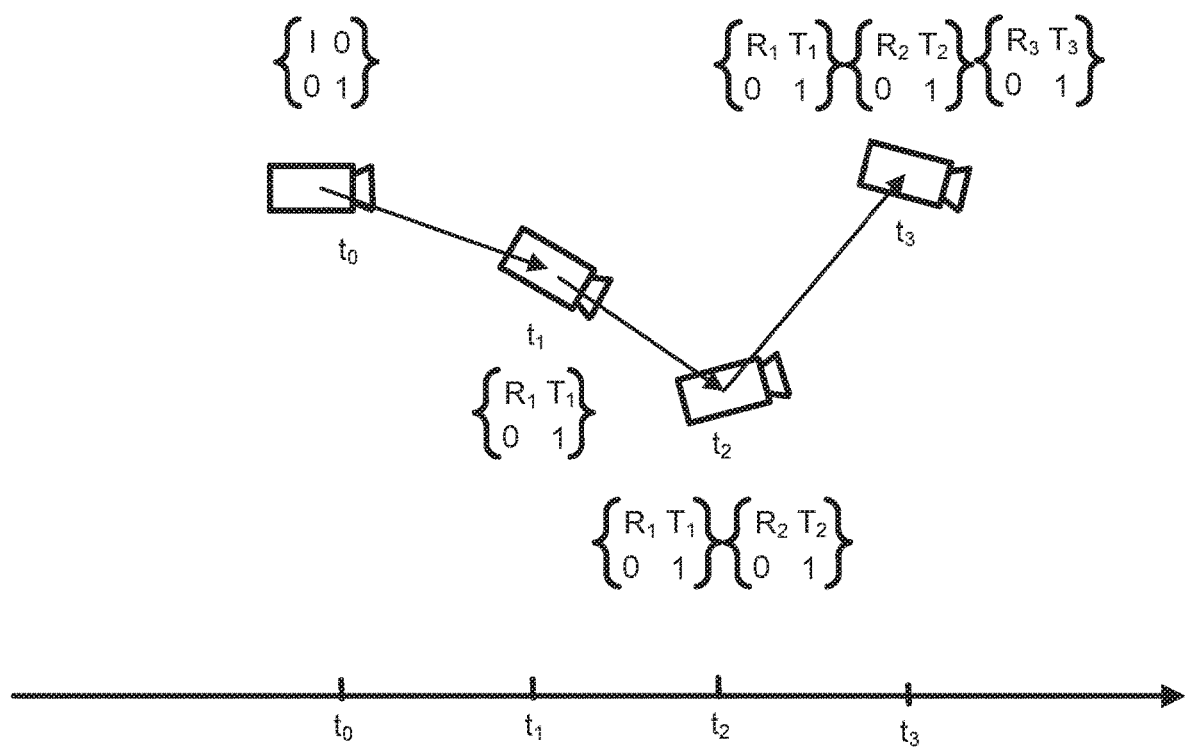
FIG. 5C is a chart illustrating the trajectory and pose of a camera of a robotic device over time without a scale estimation value.

FIG. 5C illustrates the trajectory and pose of a camera of a robotic device over time without a scale estimate.

At time $t_0$ the first pose may be described as:

$$\begin{bmatrix} I & 0 \\ 0 & 1 \end{bmatrix}.$$

From time $t_0$ to time $t_1$ the rotation (R1) and transaction (T1) may be computed, and the pose at time $t_1$ is:

$$\begin{bmatrix} R1 & sT1 \\ 0 & 1 \end{bmatrix}.$$

From time $t_1$ to time $t_2$ the rotation (R2) and transaction (T2) may be computed, and the pose at time $t_2$ is:

$$\begin{bmatrix} R1 & T1 \\ 0 & 1 \end{bmatrix} * \begin{bmatrix} R2 & T2 \\ 0 & 1 \end{bmatrix}.$$

From time $t_2$ to time $t_3$ the rotation (R3) and transaction (T3) may be computed, and the pose at time $t_3$ is:

$$\begin{bmatrix} R1 & T1 \\ 0 & 1 \end{bmatrix} * \begin{bmatrix} R2 & T2 \\ 0 & 1 \end{bmatrix} * \begin{bmatrix} R3 & T3 \\ 0 & 1 \end{bmatrix}.$$

Figure 5D:
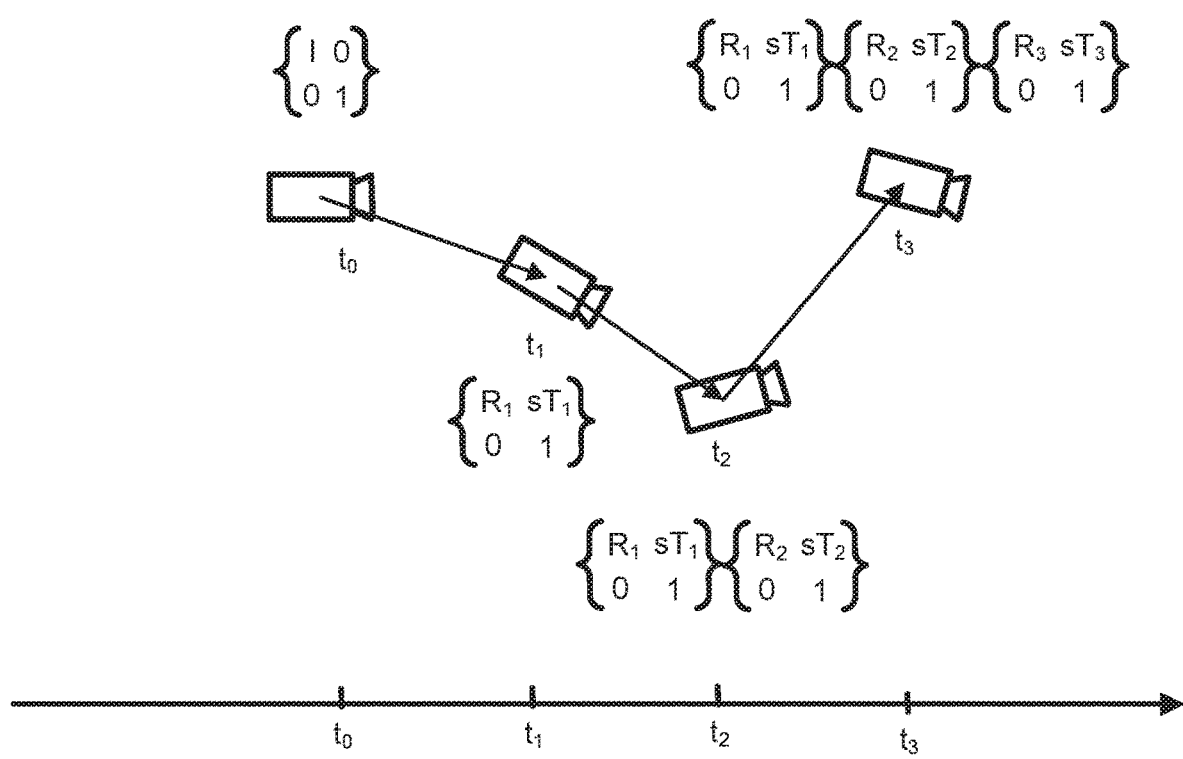
FIG. 5D is a chart illustrating the trajectory and pose of a camera of a robotic device over time with a scale estimation value.

FIG. 5D illustrates the trajectory and pose of a camera of a robotic device over time with a scale(s) estimate.

At time to the first pose may be described as:

$$\begin{bmatrix} I & 0 \\ 0 & 1 \end{bmatrix}.$$

The pose at time $t_1$ is:

$$\begin{bmatrix} R1 & sT1 \\ 0 & 1 \end{bmatrix}.$$

The pose at time $t_2$ is:

$$\begin{bmatrix} R1 & sT1 \\ 0 & 1 \end{bmatrix} * \begin{bmatrix} R2 & sT2 \\ 0 & 1 \end{bmatrix}.$$

The pose at time $t_3$ is:

$$\begin{bmatrix} R1 & sT1 \\ 0 & 1 \end{bmatrix} * \begin{bmatrix} R2 & sT2 \\ 0 & 1 \end{bmatrix} * \begin{bmatrix} R3 & sT3 \\ 0 & 1 \end{bmatrix}.$$

Figure 6:
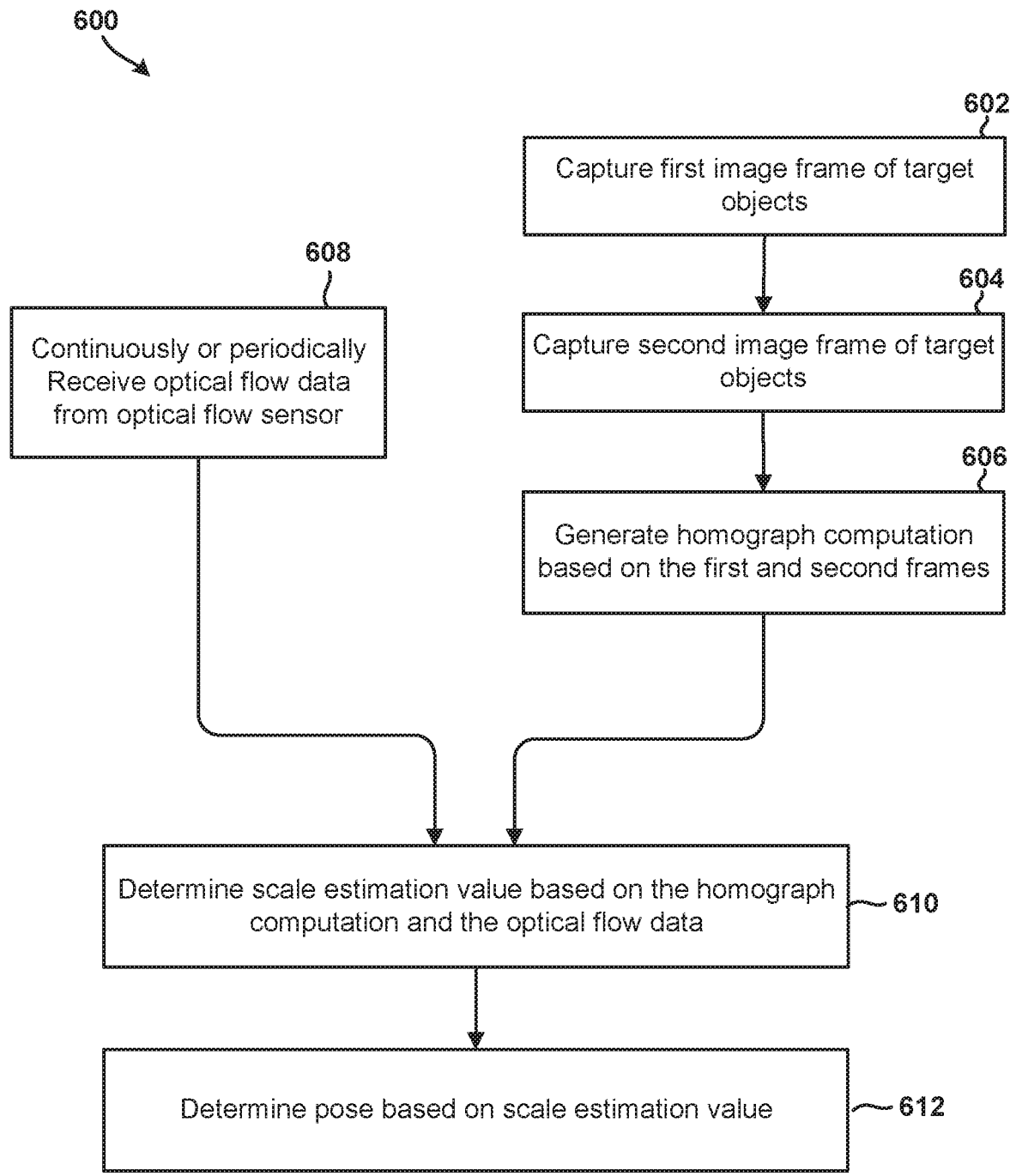
FIGS. 6 through 10 are process flow diagrams illustrating methods of determining the pose of a robotic device according to various embodiments.

FIG. 6 illustrates a method 600 of determining the pose of a robotic device according to an embodiment. With reference to FIGS. 1A-6, a processor of a robotic device (e.g., the processor 220, etc.) and hardware components and/or software components of the robotic device may attempt to determine the robotic device pose for the robotic device using any number and combination of sensors of the robotic device.

In block 602, the processor of the robotic device may receive or capture a first image frame of the environment, which may include one or more target objects. In some embodiments, the first image frame may be captured by a single (i.e., monoscopic) camera.

In block 604, the processor of the robotic device may receive or capture a second image frame of one or more target objects.

In block 606, the processor of the robotic device may generate homograph computation values based on the first and second image frames, and generate a homography matrix (H) information structure based on the homograph computation values.

In block 608, the processor of the robotic device may collect or receive optical flow sensor data from the optical flow sensor. In some embodiments, the processor of the robotic device may apply an optical flow sensor image to a Lucas-Kanade component/function to generate optical flow information that include a pixel speed value and a direction value for each feature point. In an embodiment, as part of the operations in block 608, the processor may generate an optical flow sensor transaction (To) information structure.

The operation of receiving optical flow information in block 608 is shown in parallel with the operations of capturing images in blocks 602 and 604 to illustrate that the reception of motion data from the optical flow sensor, as well as other motion or distance sensors (e.g., a wheel encoder), may be may occur in parallel with, in sequence with, or at another time interval with respect to the image capturing operations. In various embodiments, reception of distance measurements from the optical flow sensor, and other distance measuring sensors, may occur continuously, periodically, on-demand (e.g., in response to capturing the first and/or second images), and/or in response to a determination, such as in response to a processor determination that wheel slippage is or may occur. In some embodiments, distance measuring data from the optical flow sensor may be gathered continuously, such as with the information gathered and processed by a separate processor that stores the raw or process data in a memory accessible by the processor performing VSLAM. In such embodiments, the processor performing VSLAM may access stored position or distance data when needed to perform VSLAM calculations. In some embodiments, the distance measuring information received from the optical flow sensor may be received in response to capturing images to be processed for VSLAM navigation (e.g., in blocks 602 and 604), such as beginning when the first image is captured in block 602 and terminating when the second image is obtained in block 604. In some embodiments, a processor may determine whether wheel slippage is occurring (as described herein), and in response to determining that wheel slippage has occurred or is occurring, the processor may begin receiving or accessing data from the optical flow sensor. In some embodiments, a processor evaluating images used for VSLAM may include processing images to recognize or predict when wheel slippage could occur, such as detecting a steep incline, an obstacle to be overcome, a wet surface, and the like. In response to determining that wheel slippage is likely to occur (e.g., a predicted probability exceeds a threshold value), the processor may begin receiving data from the optical flow sensor. In various embodiments, the optical flow sensor may be active at all times, or may be activated when measurement data is required or demanded by the VSLAM-executing processor.

In block 610, the processor of the robotic device may compute or determine a scale estimation value based on a homograph computation (e.g., transaction T) and optical flow information (e.g., optical flow sensor transaction To).

In block 612, the processor of the robotic device may determine the robotic device pose (e.g., location, position, orientation, etc.) based on the computed or determined scale estimation value.

Figure 7:
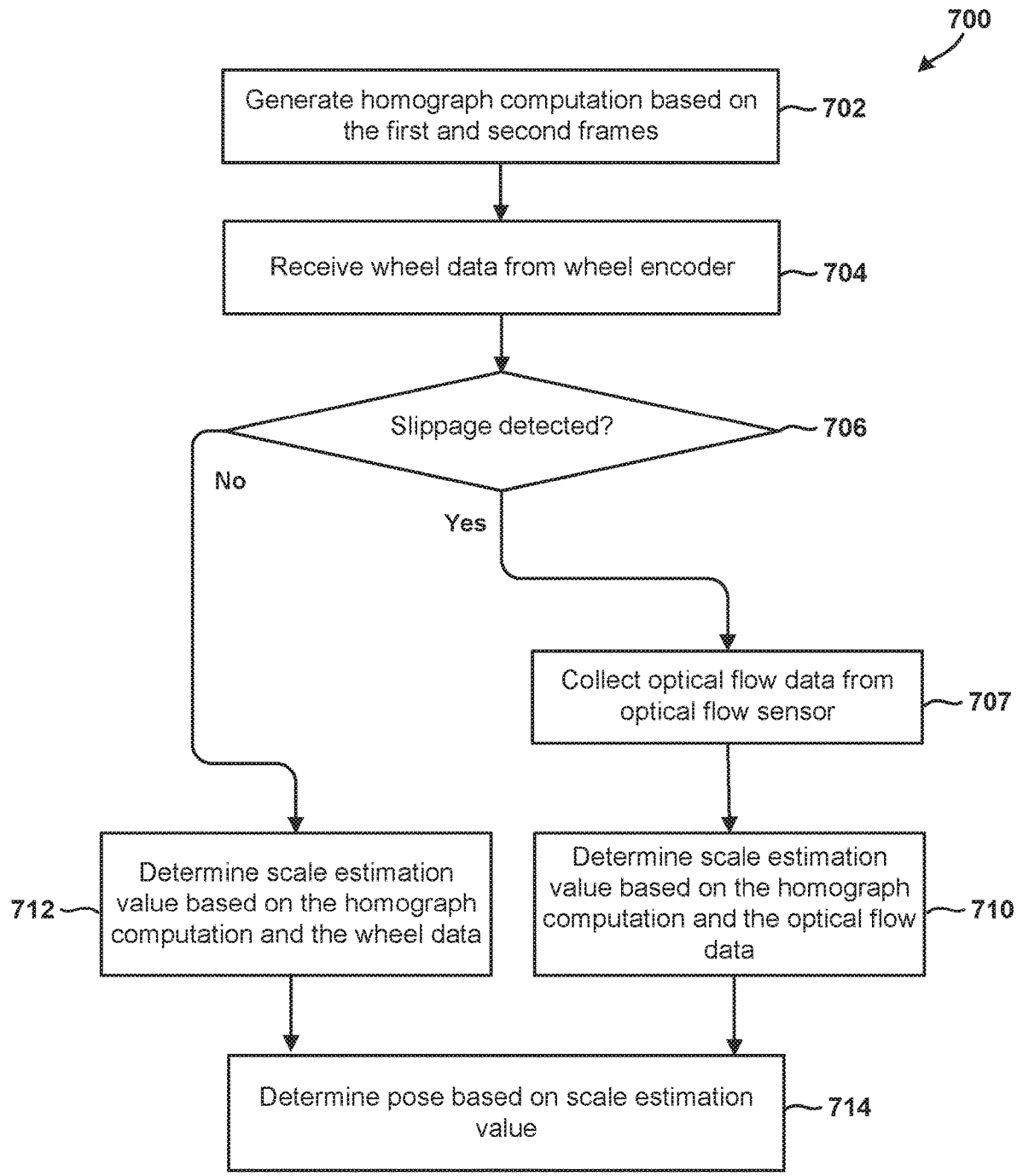

FIG. 7 illustrates a method 700 of determining the pose of a robotic device according to another embodiment. With reference to FIGS. 1A-7, a processor of a robotic device (e.g., the processor 220, etc.) and hardware components and/or software components of the robotic device may attempt to determine the robotic device pose for the robotic device using any number and combination of sensors of the robotic device. In various embodiments, the operations of the method 700 may be performed after the robotic device captures images of the target objects or capture the first and second image frames in blocks 602 and 604.

In block 702, the processor of the robotic device may generate a homograph computation (e.g., camera transaction T) based on the first and second image frames.

In block 704, the processor of the robotic device may receive wheel transaction data from a wheel encoder. In some embodiments, the received wheel transaction data may include information regarding a circumference or size of a wheel, as well as information regarding the angle of rotation, number of rotations and/or rate of rotations of the wheel. In some embodiments, the received wheel transaction data may include information identifying a displacement, distance, length between the first image frame and the second image frame. In some embodiments, the received wheel transaction data may include a wheel encoder transaction (Tw) information structure. In further embodiments, the received wheel transaction data may include any or all of component vectors, location information, orientation information, coordinate values, time values, tolerance values, confidence values, precision values, and/or other similar information suitable for use in determining displacement, distance, or length and/or the probability or likelihood that the received information is precise, accurate, or correct.

In determination block 706, the processor of the robotic device may analyze the wheel transaction data to detect slippage. In some embodiments, the robotic device may detect that slippage occurred by determining whether there was continuous change in the data, with discontinuous data indicative of slippage. In some embodiments, the robotic device may determine that slippage has been detected when the difference between the collected wheel transaction data and the expected wheel transaction data exceed a threshold value. The robotic device may determine the expected wheel transaction data based on any or all information collected from the sensors (e.g., sensors 105, 107, 154, 160-166, etc.). For example, the processor may compare motion estimates based on wheel transaction data to motion estimates based on accelerometer data over a period of time to determine whether distance or velocity estimates determined from the two sources of data are inconsistent, such as diverging by an amount that exceeds a threshold value. As another example, the processor may compare motion or distance estimates based on wheel transaction data to motion or distance estimates based on collision avoidance sensors (e.g., ultrasound sonar or radar sensors) to determine whether distance or velocity estimates determined from the two sources of data are inconsistent, such as diverging by an amount that exceeds a threshold value.

In an embodiment, the processor of the robotic device may be configured to detect slippage by determining that the wheel pose changed (or is changing continuously), but the corresponding images captured by the camera did not change (e.g., translation T from the camera is zero) or did not change by an amount consistent with the wheel rotations. In this case, the wheels moved without causing the robotic device to move significantly (i.e., the wheels are spinning in place).

In an embodiment, the processor of the robotic device may be configured to detect slippage by determining that both the wheel pose and the camera pose have changed (or are changing), but the wheel encoder transaction (Tw) is not equal to the translation from the camera (T).

In response to determining that slippage has been detected (i.e., determination block 706="Yes"), the processor of the robotic device may collect optical flow information from an optical flow sensor in block 707. In some embodiments, as part of the operations in block 707 the processor of the robotic device may apply the optical flow sensor data to a Lucas-Kanade component/function.

In block 710, the processor of the robotic device may determine a scale estimation value based on the homograph computation and the optical flow information.

In response to determining that slippage has not been detected (i.e., determination block 706="No"), the processor of the robotic device may determine the scale estimation value based on the homograph computation and the wheel transaction data in block 712.

In block 714, the processor of the robotic device may determine the robotic device pose (e.g., of the robotic device, of the image sensor of the robotic device, etc.) based on the scale estimation value.

Figure 8:
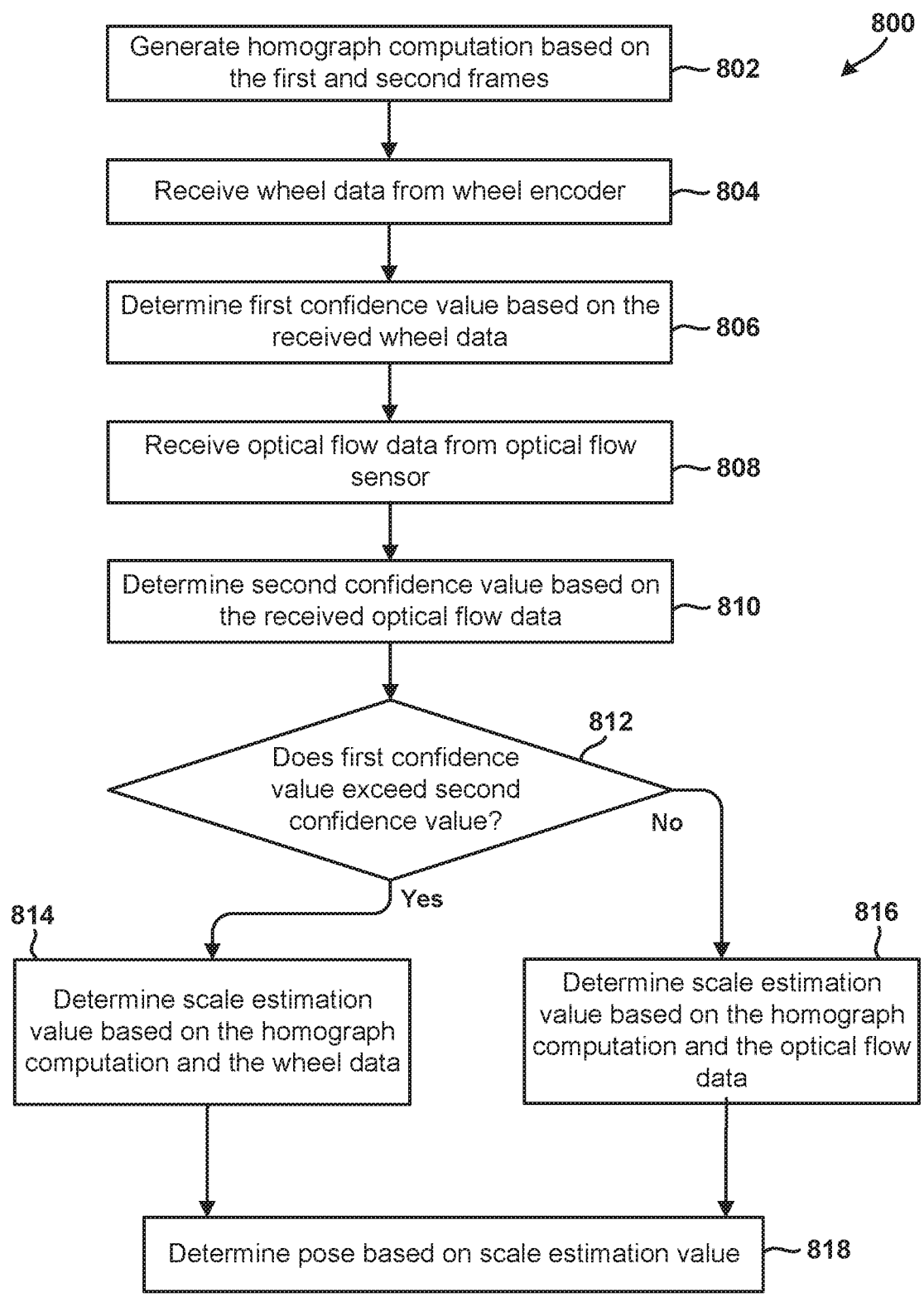

FIG. 8 illustrates a method 800 of determining the pose of a robotic device according to another embodiment. With reference to FIGS. 1A-8, a processor of a robotic device (e.g., the processor 220, etc.) and hardware components and/or software components of the robotic device may attempt to determine the robotic device pose for the robotic device using any number and combination of sensors of the robotic device. In various embodiments, the operations of the method 800 may be performed after the robotic device captures images of the target objects or capture the first and second image frames in blocks 702 and 704.

In block 802, the processor of the robotic device may generate a homograph computation based on the first and second image frames.

In block 804, the processor of the robotic device may receive wheel transaction data from a wheel encoder.

In block 806, the processor of the robotic device may compute, generate or determine a first confidence value based on the received wheel transaction data.

In block 808, the processor of the robotic device may receive optical flow information from an optical flow sensor. In some embodiments, as part of the operations in block 808, the processor of the robotic device may apply the optical flow sensor data to a Lucas-Kanade component/function to generate optical flow information that characterizes a transition or transaction between the two image frames.

In block 810, the processor of the robotic device may determine, compute, generate or determine a second confidence value based on the received optical flow information.

In determination block 812, the processor of the robotic device may determine whether the first confidence value (generated based on the received wheel transaction data) exceeds the second confidence value (generated based on the received optical flow information).

In response to determining that the first confidence value exceeds the second confidence value (i.e., determination block 812="Yes"), the processor may determine a scale estimation value based on the homograph computation and the wheel transaction data in block 814.

In response to determining that the first confidence value does not exceed the second confidence value (i.e., determination block 812="No"), the processor may determine a scale estimation value based on the homograph computation and the optical flow information in block 816.

In block 818, the processor of the robotic device may compute, generate or determine the robotic device pose (e.g., of the robotic device, of the image sensor of the robotic device, etc.) based on the scale estimation value.

Figure 9:
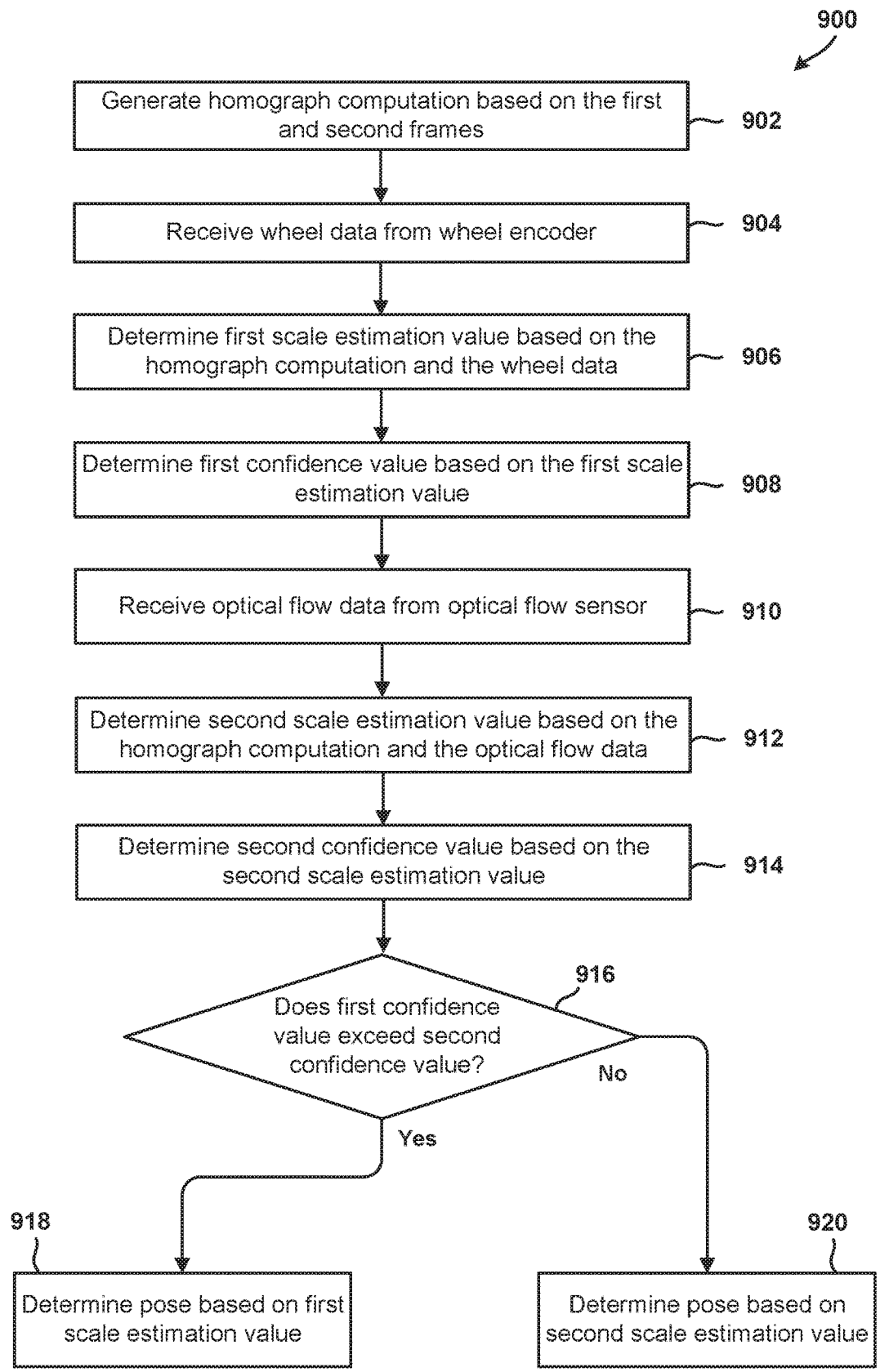

FIG. 9 illustrates a method 900 of determining the pose of a robotic device according to another embodiment. With reference to FIGS. 1A-9, a processor of a robotic device (e.g., the processor 220, etc.) and hardware components and/or software components of the robotic device may attempt to determine the robotic device pose for the robotic device using any number and combination of sensors of the robotic device. In various embodiments, the operations of the method 900 may be performed after the robotic device captures images of the target objects in block 502 or capture the first and second image frames in blocks 702 and 704.

In block 902, the processor of the robotic device may compute, generate or determine a homograph computation based on the first and second image frames.

In block 904, the processor of the robotic device may receive wheel transaction data from a wheel encoder.

In block 906, the processor of the robotic device may compute, generate or determine a first scale estimation value based on the homograph computation and the wheel transaction data.

In block 908, the processor of the robotic device may compute, generate or determine a first confidence value based on the first scale estimation value.

In block 910, the processor of the robotic device may receive optical flow information from an optical flow sensor. In some embodiments, as part of the operations in block 910, the processor of the robotic device may apply the optical flow sensor data to a Lucas-Kanade component/function to generate optical flow information that characterizes a transition or transaction between the two image frames.

In block 912, the processor of the robotic device may compute, generate or determine a second scale estimation value based on the homograph computation and the optical flow information.

In block 914, the processor of the robotic device may compute, generate or determine a second confidence value based on the second scale estimation value.

In determination block 916, the processor of the robotic device may determine whether the first confidence value (based on the wheel transaction data) exceeds the second confidence value (based on the optical flow information).

In response to determining that the first confidence value exceeds the second confidence value (i.e., determination block 916="Yes"), the processor may compute, generate or determine the robotic device pose based on the first scale estimation value in block 918.

In response to determining that the first confidence value does not exceed the second confidence value (i.e., determination block 916="No"), the processor may compute, generate or determine the robotic device pose based on the second scale estimation value in block 920.

Figure 10:
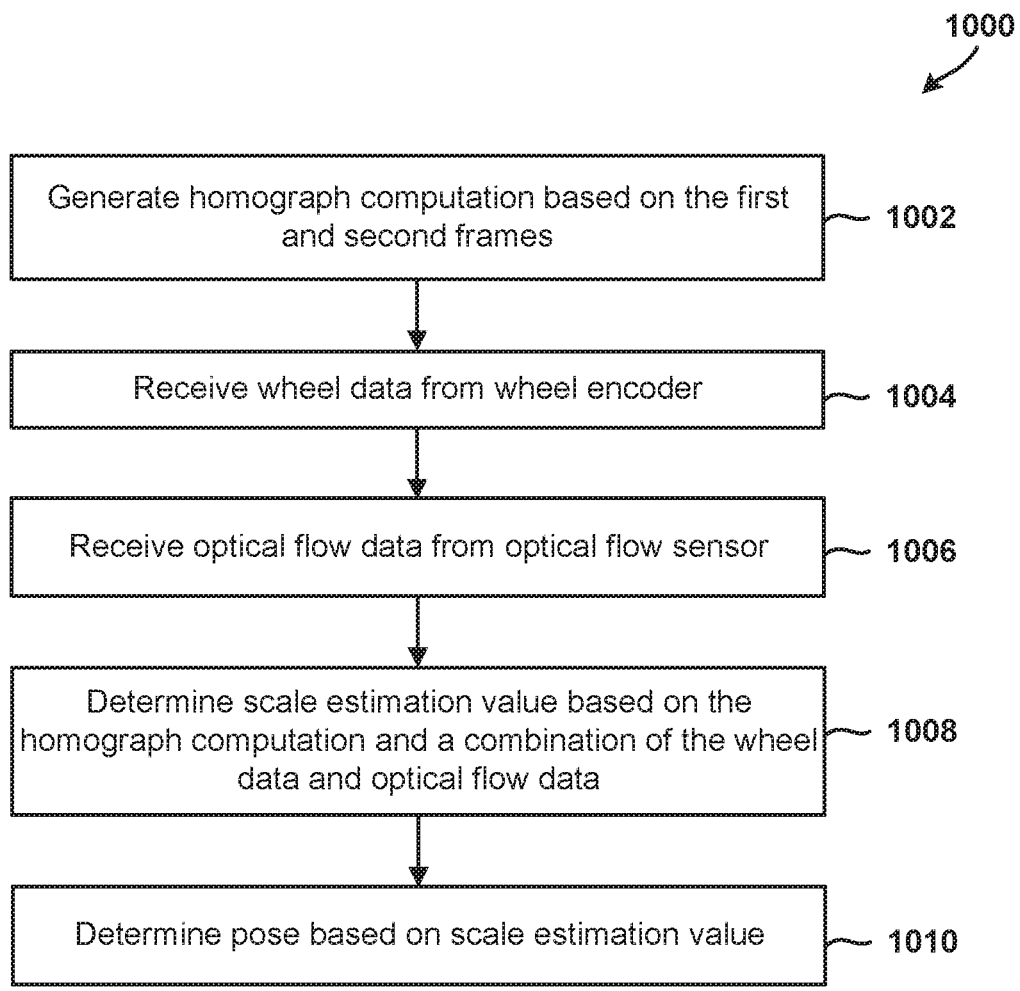

FIG. 10 illustrates a method 1000 of determining scale estimation value and the pose of a robotic device in accordance with an embodiment so to improve navigation. With reference to FIGS. 1A-10, a processor of a robotic device (e.g., the processor 220, etc.) and hardware components and/or software components of the robotic device may attempt to determine the robotic device pose for the robotic device using any number and combination of sensors of the robotic device. In various embodiments, the operations of the method 1000 may be performed after the robotic device captures images of the target objects in block 502 or capture the first and second image frames in blocks 702 and 704.

In block 1002, the processor of the robotic device may compute, generate or determine a homograph computation based on the first and second image frames.

In block 1004, the processor of the robotic device may receive wheel transaction data from a wheel encoder.

In block 1006, the processor of the robotic device may receive optical flow information from an optical flow sensor. In some embodiments, as part of the operations in block 1006, the processor of the robotic device may apply the optical flow sensor data to a Lucas-Kanade component/function to generate optical flow information that characterizes a transition or transaction between the two image frames.

In block 1008, the processor of the robotic device may determine scale estimation value based on the homograph computation and a combination of the wheel transaction data and optical flow information (e.g., optical flow sensor transaction To). For example, the processor may perform sensor fusion operations to normalize and combine the wheel transaction data with the optical flow information, and determine the scale estimation value based on the homograph computation and the results of the sensor fusion operations.

In block 1010, the processor of the robotic device may compute, generate or determine the robotic device pose based on the determined scale estimation value.

Various embodiments also improve the accuracy of the robotic device's VSLAM capabilities using a more accurately determined robotic device pose.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 600, 700, 800, 900 and 1000 may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of performing visual simultaneous localization and mapping (VSLAM) by a processor of a robotic device, comprising:

receiving a first image frame from a monocular image sensor;

receiving a second image frame from the monocular image sensor;

generating a homograph computation based on the first image frame and the second image frame;

receiving wheel transaction data from a wheel encoder;

receiving optical flow sensor data from an optical flow sensor; and determining a scale estimation value corresponding to a scale of one or more features in the first image frame and the second image frame based on the homograph computation and based on the optical flow sensor data or the wheel transaction data.

2. The method of claim 1, wherein generating the homograph computation based on the first image frame and the second image frame comprises:

generating a homography matrix information structure; and generating a transaction information structure by performing a singular value decomposition (SVD) operation on the generated homography matrix information structure.

3. The method of claim 2, wherein generating the homograph computation based on the first image frame and the second image frame further comprises:

identifying at least four feature points in the first image frame;

identifying at least four corresponding feature points in the second image frame; and generating the homography matrix information structure to include the identified at least four feature points and the identified at least four corresponding feature points.

4. The method of claim 1, further comprising determining a robotic device pose of the robotic device based on the scale estimation value.

5. The method of claim 4, further comprising:

determining a wheel-based scale estimation value based on the homograph computation and the wheel transaction data;

determining a first confidence value based on the wheel-based scale estimation value; and determining a second confidence value based on the scale estimation value based on the optical flow sensor data, wherein determining the robotic device pose based on the scale estimation value comprises:

determining the robotic device pose based on the scale estimation value in response to determining that the first confidence value does not exceed the second confidence value; and determining the robotic device pose based on the wheel transaction data in response to determining that the first confidence value exceeds the second confidence value.

6. The method of claim 5, wherein:

generating the homograph computation based on the first image frame and the second image frame comprises generating a camera transaction information structure based on the first image frame and the second image frame; and determining the wheel-based scale estimation value based on the homograph computation and the wheel transaction data comprises:

generating a wheel encoder transaction information structure based on the wheel transaction data; and determining the wheel-based scale estimation value based on values included in the camera transaction information structure and values included in the wheel encoder transaction information structure.

7. The method of claim 1, further comprising:

determining an amount of slippage that occurred over a time period based on at least one of the wheel transaction data or the optical flow sensor data; and determining whether the determined amount of slippage exceeds a slippage threshold value, wherein determining the scale estimation value based on the homograph computation and based on the optical flow sensor data or the wheel transaction data comprises:

determining the scale estimation value based on the homograph computation and the optical flow sensor data in response to determining that the determined amount of slippage exceeds the slippage threshold value; and determining the scale estimation value based on the homograph computation and the wheel transaction data in response to determining that the determined amount of slippage does not exceed the slippage threshold value.

8. The method of claim 1, further comprising:

determining whether the wheel transaction data includes erroneous or outlier data;

wherein determining the scale estimation value based on the homograph computation and based on the optical flow sensor data or the wheel transaction data comprises determining the scale estimation value based on the homograph computation and the optical flow sensor data in response to determining that the wheel transaction data includes erroneous or outlier data.

9. The method of claim 1, further comprising:

determining a first confidence value based on the wheel transaction data;

determining a second confidence value based on the optical flow sensor data; and determining whether the first confidence value exceeds the second confidence value, wherein determining the scale estimation value based on the homograph computation and based on the optical flow sensor data or the wheel transaction data comprises:

determining the scale estimation value based on the homograph computation and based on the optical flow sensor data in response to determining that the first confidence value does not exceed the second confidence value; and determining the scale estimation value based on the homograph computation and based on the wheel transaction data in response to determining that the first confidence value exceeds the second confidence value.

10. The method of claim 1, further comprising:

applying the optical flow sensor data to a Lucas-Kanade component to generate optical flow information that includes a pixel speed value and a direction value for at least one feature point; and generating an optical flow sensor transaction information structure based on the optical flow information, wherein determining the scale estimation value based on the homograph computation and based on the optical flow sensor data or the wheel transaction data comprises determining the scale estimation value based on the homograph computation and the generated optical flow sensor transaction information structure.

11. A robotic device, comprising:
a memory;
a sensor; and
a processor communicatively connected to the memory and the sensor, and configured with processor-executable instructions to:
   receive a first image frame from a monocular image sensor;
   receive a second image frame from the monocular image sensor;
   generate a homograph computation based on the first image frame and the second image frame;
   receive wheel transaction data from a wheel encoder;
   receive optical flow sensor data from an optical flow sensor; and
   determine a scale estimation value corresponding to a scale of one or more features in the first image frame and the second image frame based on the homograph computation and based on the optical flow sensor data or the wheel transaction data.

12. The robotic device of claim 11, wherein the processor is further configured with processor-executable instructions to generate the homograph computation based on the first image frame and the second image frame by:
   generating a homography matrix information structure; and
   generating a transaction information structure by performing a singular value decomposition (SVD) operation on the generated homography matrix information structure.

13. The robotic device of claim 12, wherein the processor is further configured with processor-executable instructions to generate the homograph computation based on the first image frame and the second image frame by:
   identifying at least four feature points in the first image frame;
   identifying at least four corresponding feature points in the second image frame; and
   generating the homography matrix information structure to include the identified at least four feature points and the identified at least four corresponding feature points.

14. The robotic device of claim 11, wherein the processor is further configured with processor-executable instructions to determine a robotic device pose of the robotic device based on the scale estimation value.

15. The robotic device of claim 11, wherein:
the processor is further configured with processor-executable instructions to:
   determine a wheel-based scale estimation value based on the homograph computation and the wheel transaction data;
   determine a first confidence value based on the wheel-based scale estimation value; and
   determine a second confidence value based on the scale estimation value based on the optical flow sensor data, and
the processor is further configured with processor-executable instructions to determine a robotic device pose based on the scale estimation value by:
   determining the robotic device pose based on the scale estimation value based on the optical flow sensor data in response to determining that the first confidence value does not exceed the second confidence value; and
   determining the robotic device pose based on the wheel transaction data in response to determining that the first confidence value exceeds the second confidence value.

16. The robotic device of claim 15, wherein the processor is further configured with processor-executable instructions to:
   generate the homograph computation based on the first image frame and the second image frame by generating a camera transaction information structure based on the first image frame and the second image frame; and
   determine the wheel-based scale estimation value based on the homograph computation and the wheel transaction data by:
      generating a wheel encoder transaction information structure based on the wheel transaction data; and
      determining the wheel-based scale estimation value based on values included in the camera transaction information structure and values included in the wheel encoder transaction information structure.

17. The robotic device of claim 11, wherein:
the processor is further configured with processor-executable instructions to:
   determine an amount of slippage that occurred over a time period based on at least one of the wheel transaction data or the optical flow sensor data; and
   determine whether the determined amount of slippage exceeds a slippage threshold value, and
the processor is further configured with processor-executable instructions to determine the scale estimation value based on the homograph computation and based on the optical flow sensor data or the wheel transaction data by:
   determining the scale estimation value based on the homograph computation and the optical flow sensor data in response to determining that the determined amount of slippage exceeds the slippage threshold value; and
   determining the scale estimation value based on the homograph computation and the wheel transaction data in response to determining that the determined amount of slippage does not exceed the slippage threshold value.

18. The robotic device of claim 11, wherein:
the processor is further configured with processor-executable instructions to:
   determine whether the wheel transaction data includes erroneous or outlier data; and
the processor is further configured with processor-executable instructions to determine the scale estimation value based on the homograph computation and based on the optical flow sensor data or the wheel transaction data by determining the scale estimation value based on the homograph computation and the optical flow sensor data in response to determining that the wheel transaction data includes erroneous or outlier data.

19. The robotic device of claim 11, wherein:
the processor is further configured with processor-executable instructions to:
   determine a first confidence value based on the wheel transaction data;
   determine a second confidence value based on the optical flow sensor data; and
   determine whether the first confidence value exceeds the second confidence value, and
the processor is further configured with processor-executable instructions to determine the scale estimation value based on the homograph computation and based on the optical flow sensor data or the wheel transaction data by:
  determining the scale estimation value based on the homograph computation and based on the optical flow sensor data in response to determining that the first confidence value does not exceed the second confidence value; and
  determining the scale estimation value based on the homograph computation and based on the wheel transaction data in response to determining that the first confidence value exceeds the second confidence value.

20. The robotic device of claim 11, wherein:
the processor is further configured with processor-executable instructions to:
  apply the optical flow sensor data to a Lucas-Kanade component to generate optical flow information that includes a pixel speed value and a direction value for at least one feature point; and
  generate an optical flow sensor transaction information structure based on the optical flow information; and
the processor is further configured with processor-executable instructions to determine the scale estimation value based on the homograph computation and the optical flow sensor data or the wheel transaction data by determining the scale estimation value based on the homograph computation and the generated optical flow sensor transaction information structure.

21. A processing device configured for use in a robotic vehicle, wherein the processing device is configured to:
  receive a first image frame from a monocular image sensor;
  receive a second image frame from the monocular image sensor;
  generate a homograph computation based on the first image frame and the second image frame;
  receive wheel transaction data from a wheel encoder;
  receive optical flow sensor data from an optical flow sensor; and
  determine a scale estimation value corresponding to a scale of one or more features in the first image frame and the second image frame based on the homograph computation and based on the optical flow sensor data or wheel transaction data.

22. The processing device of claim 21, wherein the processing device is further configured to generate the homograph computation based on the first image frame and the second image frame by:
  generating a homography matrix information structure; and
  generating a transaction information structure by performing a singular value decomposition (SVD) operation on the generated homography matrix information structure.

23. The processing device of claim 22, wherein the processing device is further configured to generate the homograph computation based on the first image frame and the second image frame by:
  identifying at least four feature points in the first image frame;
  identifying at least four corresponding feature points in the second image frame; and
  generating the homography matrix information structure to include the identified at least four feature points and the identified at least four corresponding feature points.

24. The processing device of claim 21, wherein the processing device is further configured to:
  determine a wheel-based scale estimation value based on the homograph computation and the wheel transaction data;
  determine a first confidence value based on the wheel-based scale estimation value; and
  determine a second confidence value based on the scale estimation value based on the optical flow sensor data;
  determining a robotic device pose based on the scale estimation value based on the optical flow sensor data in response to determining that the first confidence value does not exceed the second confidence value; and
  determining the robotic device pose based on the wheel transaction data in response to determining that the first confidence value exceeds the second confidence value.

25. The processing device of claim 24, wherein the processing device is further configured to:
  generate the homograph computation based on the first image frame and the second image frame by generating a camera transaction information structure based on the first image frame and the second image frame; and
  determine the wheel-based scale estimation value based on the homograph computation and the wheel transaction data by:
    generating a wheel encoder transaction information structure based on the wheel transaction data; and
    determining the wheel-based scale estimation value based on values included in the camera transaction information structure and values included in the wheel encoder transaction information structure.

26. The processing device of claim 21, wherein:
the processing device is further configured to:
  determine an amount of slippage that occurred over a time period based on at least one of the wheel transaction data or the optical flow sensor data; and
  determine whether the determined amount of slippage exceeds a slippage threshold value; and
the processing device is further configured to determine the scale estimation value based on the homograph computation and based on the optical flow sensor data or the wheel transaction data by:
  determining the scale estimation value based on the homograph computation and based on the optical flow sensor data in response to determining that the determined amount of slippage exceeds the slippage threshold value; and
  determining the scale estimation value based on the homograph computation and based on the wheel transaction data in response to determining that the determined amount of slippage does not exceed the slippage threshold value.

27. The processing device of claim 21, wherein:
the processing device is further configured to:
  determine whether the wheel transaction data includes erroneous or outlier data; and
the processing device is further configured to determine the scale estimation value based on the homograph computation and the optical flow sensor data or the wheel transaction data by determining the scale estimation value based on the homograph computation and the optical flow sensor data in response to determining that the wheel transaction data includes erroneous or outlier data.

28. The processing device of claim 21, wherein:
the processing device is further configured to:
- determine a first confidence value based on the wheel transaction data;
- determine a second confidence value based on the optical flow sensor data; and
- determine whether the first confidence value exceeds the second confidence value; and the processing device is further configured to determine the scale estimation value based on the homograph computation and the optical flow sensor data or the wheel transaction data by:
- determining the scale estimation value based on the homograph computation and based on the optical flow sensor data in response to determining that the first confidence value does not exceed the second confidence value; and
- determining the scale estimation value based on the homograph computation and based on the wheel transaction data in response to determining that the first confidence value exceeds the second confidence value.

29. The processing device of claim 21, wherein:
the processing device is further configured to:
- apply the optical flow sensor data to a Lucas-Kanade component to generate optical flow information that includes a pixel speed value and a direction value for at least one feature point; and
- generate an optical flow sensor transaction information structure based on the optical flow information; and the processing device is further configured to determine the scale estimation value based on the homograph computation and the optical flow sensor data or the wheel transaction data by determining the scale estimation value based on the homograph computation and the generated optical flow sensor transaction information structure.

30. A robotic device, comprising:
- means for receiving a first image frame from a monocular image sensor;
- means for receiving a second image frame from the monocular image sensor;
- means for generating a homograph computation based on the first image frame and the second image frame;
- means for receive wheel transaction data from a wheel encoder;
- means for receiving optical flow sensor data from an optical flow sensor; and
- means for determining a scale estimation value corresponding to a scale of one or more features in the first image frame and the second image frame based on the homograph computation and the optical flow sensor data or wheel transaction data.

* * * * *